United States Patent [19]

Narita et al.

[11] Patent Number: 5,607,209
[45] Date of Patent: Mar. 4, 1997

[54] BRAKING APPARATUS AND BRAKING METHOD FOR VEHICLE

[75] Inventors: Tomohiro Narita, Okazaki, Japan; Hiroki Tsuge, Frankfurt am Main, Germany; Susumu Nishikawa; Kazumi Ishida, both of Okazaki, Japan; Takeshi Yamazaki, Anjo, Japan

[73] Assignee: Mitsubishi Jidosha Kogyo Kabushiki Kaisha, Tokyo, Japan

[21] Appl. No.: 465,056

[22] Filed: Jun. 5, 1995

[30] Foreign Application Priority Data

Jun. 6, 1994 [JP] Japan .................... 6-123515
May 1, 1995 [JP] Japan .................... 7-107285

[51] Int. Cl.⁶ .................. B60T 13/52; B60T 13/68
[52] U.S. Cl. .................. 303/122.11; 303/15
[58] Field of Search ............ 303/15, 16, 122.03, 303/122.11, 122.15, 127, 155, 166, 113.4, 114.3, DIG. 1–DIG. 4, 20

[56] References Cited

U.S. PATENT DOCUMENTS 5,378,052   1/1995   Yoshino ................. 303/15 X

FOREIGN PATENT DOCUMENTS 4208496   8/1993   Germany .
4329139   7/1994   Germany .
4325940   12/1994  Germany .
4413172   3/1995   Germany .
542862    2/1993   Japan .

*Primary Examiner*—Josie Ballato

[57] ABSTRACT

When a brake pedal is operated by the vehicle driver, and detection signals from hydraulic pressure sensors and a brake switch, for detecting pressure of the brake pedal, are supplied to an ECU, the ECU performs a determination according to the detection signals as to whether or not the hydraulic pressure PM is a maximum pressure gradient d(PM)/dtmax. When the determination result of the braking condition is an emergency braking condition, an intake valve is opened. Thereafter, atmosphere is forcibly supplied to atmospheric chambers of a booster, to assist the braking force.

28 Claims, 31 Drawing Sheets

Specified value of M/C pressure gradient (MPa/s)

Running time ration (%)

Average speed (km/h)

Running time ration (%)

Average speed (km/h)

BRAKING APPARATUS AND BRAKING METHOD FOR VEHICLE

BACKGROUND OF THE INVENTION

This invention relates to a braking apparatus and braking method for a vehicle, more specifically, to a technology for rapid braking.

As a braking force assist method, a brake system of a vehicle has often been provided with a booster for assisting a force of the driver to press down the brake pedal. The booster utilizes a negative pressure or the like, generated in the intake manifold of the engine, to operate a power piston having a constant area for assisting the braking force.

Further, as a braking force assist method for rapid braking in an emergency, one which varies the braking characteristics to a safety side, if the distance from another vehicle running in front is less than a predetermined value, or a relative speed is more than a predetermined value, has been disclosed, for example, in Japanese Patent Laid-open Publication 05-42862.

A known booster has been designed so that assist by a negative pressure is not started unless the brake pedal is operated by a predetermined pressing force, and the output (brake pressure) obtained through the booster is uniformly set relative to the force of pressing down the brake pedal. Therefore, for a driver who tends to be weak in providing a brake pedal operating force, the brake pressure does not immediately increase when the brake pedal is pressed down. Thus, a time period is required before braking action begins. In particular, when the vehicle is to be stopped in an emergency, it may be difficult to sufficiently utilize the brake performance.

The brake operation condition differs depending on various traffic environments such as vehicle travel on a city road, a mountain road, or a crowded road. The brake operation condition also differs depending on the operation tendency (driving condition) intended by the driver such as a driver desiring normal driving, sporty driving hard driving and the like.

Since the above conventional techniques do not consider traffic environments for the vehicle or driving tendency intended by the driver, a determination of rapid braking may be uncertain under different traffic environments or under different driving tendencies.

OBJECT AND SUMMARY OF THE INVENTION

In view of such known problems, a primary object of the present invention is to provide a braking method and apparatus for a vehicle which sufficiently utilizes the brake performance in rapid braking in emergency even for a driver who is weak in applying a brake pedal operating force.

The braking apparatus for a vehicle according to the present invention comprises an operation member operated by the driver; a booster for exerting a braking force according to an operation force of the operation member on the vehicle wheels; braking force increasing means for increasing the output of the booster irrespective of the operation force of the operation member; and braking condition determination means for determining whether the braking operation by the operation member is a normal braking operation or a braking operation in an emergency situation; and control means for, when the braking operation is determined by the braking condition determination means to be a normal braking condition, exerting a braking force according to the operation force of the operation member on the vehicle wheels by the booster, or for when the braking is determined to be an emergency braking condition, increasing the output of the booster by the braking force increasing means irrespective of the operation force of the operation member, to exert a braking force larger than the braking force for normal braking on the vehicle wheels.

Preferably, the braking condition determination means is provided with operation force detection means for detecting the operation force of the operation member. An emergency braking condition is determined when a maximum operation force of the operation force detected by the operation force detection means is greater than a preset operation force, wherein a time from the beginning of operation of the operation member until the maximum operation force is reached is more than a preset length of time. Further, preferably, the braking condition determination means includes storage means for successively updating and storing the value of the operation force to a greater value detected by the operation force detection means. Further, an emergency braking condition is determined when the maximum operation force newly updated after the operation time exceeds the preset time exceeds the preset operation force. The operation member is preferably a brake pedal, and the operation force detection means is preferably a pressing force sensor mounted to the brake pedal.

Still further, preferably, the booster is linked to the operation member, and is provided with a master cylinder which converts the operation force of the operation member to a hydraulic pressure and outputs a braking force acting upon the vehicle wheels. Further preferably, the braking condition determination means is provided with pressure detection means for detecting the hydraulic pressure as the output of the master cylinder. Further, an emergency braking condition is preferably determined when a maximum pressure gradient of a pressure gradient detected by the pressure detection means is greater than a preset pressure gradient. Finally, the time lapse from the beginning of operation of the operation member until the maximum pressure gradient is reached is preferably more than a preset time lapse. In this case, the braking condition determination means also preferably includes storage means for successively updating and storing a greater value of the pressure gradient value detected by the pressure detection means as the maximum pressure gradient. Further, an emergency braking condition is determined when the maximum pressure gradient, newly updated after the operation time exceeds the preset time, exceeds the preset pressure gradient. Alternatively, the braking condition determination means is provided with pressure detection means for detecting the hydraulic pressure as the output of the master cylinder. Thus, an emergency braking condition is determined when the first condition is met where an average value of the detected pressure from the time at which the pressure gradient detected by the pressure detection means, to before a first preset time added with the preset value is greater than the detected pressure after a second preset time from that time. Thereafter the time lapse from the above time is preferably more than a third preset time, and pressure gradient is preferably greater than a second preset pressure gradient. In this case, the braking condition determination means measures the length of time when the pressure gradient is zero or a negative value when the first condition is met, determines a normal braking condition when the time is more than a fourth preset time, and cancels the meeting of the first condition.

Preferably, the control means includes operation detection means for detecting whether or not the driver operates the operation member, and first prohibition means for prohibiting operation of the braking force increasing means when it is detected that the driver does not operate the operation member. This is achieved by a signal detected from the operation detection means after an emergency braking condition is determined by the braking condition determination means.

Yet further, preferably, the control means includes operation force detection means for detecting the operation force of the operation member, and includes second prohibition means for prohibiting operation of the braking force increasing means when the operation force detected by the operation force detection means is less than a preset value after an emergency braking condition is determined by the braking condition determination means.

There is another aspect of the braking apparatus for a vehicle according to the present invention which comprises vehicle speed detection means for detecting a vehicle speed, steering wheel angle detection means for detecting a steering wheel angle, an accelerator opening sensor for detecting an accelerator opening, first estimation means for estimating the traffic condition of the vehicle using a running time ratio and an average speed derived from the vehicle speed detected by the vehicle speed detection means, and an average lateral acceleration derived from the vehicle speed and the steering wheel angle detected by the steering wheel angle detection means, second estimation means for estimating an operation tendency intended by the driver using a frequency analysis value of accelerator opening derived from the accelerator opening detected by the accelerator opening sensor, a frequency analysis value of vehicle speed detected by the vehicle speed sensor, a frequency analysis value of a longitudinal direction acceleration derived from the vehicle speed, a frequency analysis value of lateral acceleration derived from the vehicle speed and the steering wheel angle, and the traffic condition estimated by the first estimation means, and preset pressure gradient changing means for changing the preset pressure gradient according to the operation tendency estimated by the second estimation means.

Alternatively, the braking apparatus for a vehicle comprises vehicle speed detection means for detecting a vehicle speed, steering wheel angle detection means for detecting a steering wheel angle, an accelerator opening sensor for detecting an accelerator opening, first estimation means for estimating the traffic condition of the vehicle using a running time ratio and an average speed derived from the vehicle speed detected by the vehicle speed detection means, and an average lateral acceleration derived from the vehicle speed and the steering wheel angle detected by the steering wheel angle detection means, second estimation means for estimating an operation tendency intended by the driver using a frequency analysis value of accelerator opening derived from the accelerator opening detected by the accelerator opening sensor, a frequency analysis value of vehicle speed detected by the vehicle speed sensor, a frequency analysis value of a longitudinal direction acceleration derived from the vehicle speed, a frequency analysis value of lateral acceleration derived from the vehicle speed and the steering wheel angle, and the traffic condition estimated by the first estimation means, and preset pressure gradient changing means for changing the preset pressure gradient according to the operation tendency estimated by the second estimation means.

Preferably, in this case, the second estimation means determines frequency distributions of the individual parameters of the accelerator opening, the vehicle speed, the longitudinal direction acceleration, and the lateral acceleration, and estimates the operation tendency based on a weighted total sum of average values and variances of the individual parameters derived from the frequency distributions and the traffic condition estimated by the first estimation means.

One advantage of the present invention is that since it comprises the operation member operated by the driver; the booster for assisting and exerting the braking force on the wheels according to the operation force of the operation member; the braking force increasing means for increasing the output of the booster irrespective of operation of the operation member; the braking condition determination means for determining whether the braking operation by the operation member is a normal braking operation or an emergency braking operation; and control means which, when the braking operation is determined by the braking condition determination means to be a normal braking operation, the braking force according to the operation force of the operation member is exerted by booster on the wheels, or when the braking is determined to be an emergency braking operation, the output of the booster is increased by the braking force increasing means irrespective of the operation force of the operation member and a braking force greater than normal braking is exerted on the wheels; the brake performance can be sufficiently utilized even by a driver who is able to supply only a weak operation force to the operation member.

By determining an emergency braking condition in the braking condition determination means, the maximum operation force of the operation force detected by the operation force detection means is greater than the preset operation force, and the time lapse from the beginning of operation of the operation member until the time when the maximum operation force is reached is greater than the preset time, the braking condition can be readily determined.

Further, the braking condition determination means includes storage means for successively updating and storing a greater value of the operation force detected by the operation force detection means as the maximum operation force. Also, an emergency braking condition is determined when the maximum operation force newly updated after the operation time exceeds the preset time, exceeds the preset operation force, thereby easily and exactly determining an emergency braking condition by a driver applying a weak operation force to the operation member.

Still further, since the operation member is a brake pedal, and the operation force detection means is a pressing force sensor mounted to the brake pedal, the operation force of the operation member applied by the driver can be directly and positively detected.

Yet further, since the booster is linked to the operation member, and the master cylinder is provided, which converts the operation force of the operation member to a hydraulic pressure, to output the braking force acting upon the vehicle wheels, the operation force of the operation member can be appropriately exerted on the wheels in an emergency braking situation.

Since, in the operation condition determination means, emergency braking is determined when the maximum operation force of the operation force detected by the operation force detection means is greater than the preset value, and the time lapse from the beginning of operation of the operation member until the maximum operation force is reached is more than the preset time, the braking condition can be easily and exactly determined. The brake performance can be sufficiently utilized in an emergency braking situation even by a driver applying only a weak operation force of the operation, member and the running safety of the vehicle can be improved.

The braking condition determination means includes storage means for successively updating and storing a greater value of the pressure gradient detected by the pressure detection means as the maximum pressure gradient. Further, emergency braking is determined when the maximum pressure gradient, newly updated after the operation time exceeds the preset time, exceeds the preset pressure gradient. Thus, emergency braking by a driver applying a weak operation force to the operation member can be easily and exactly determined.

In the braking condition determination means, by determining emergency braking when the first condition is met where an average value of the detected pressure from the time at which the pressure gradient detected by the pressure detection means to before the first preset time added with the preset value is greater than the detected pressure after the second preset time from that time, the time lapse from that time is more than the third preset time, and the pressure gradient is greater than the second preset pressure gradient. Thus, the brake performance can be sufficiently utilized in an emergency braking situation even by a driver applying a weak operation force to the operation member, and the running safety of the vehicle can be improved.

Since, in the braking condition determination means, while the first condition is met, the time when the pressure gradient is zero or a negative value is measured. Normal braking is determined when the time is more than a fourth of the preset time to cancel the first condition. Thus, a normal braking situation or an emergency braking situation can be exactly determined, and the brake force can be assisted only for rapid braking.

Since the control means includes the operation detection means for detecting whether or not the driver operates the operation member, and also includes the first prohibition means for prohibiting operation of the braking force increasing means when it is detected that the driver does not operate the operation member by a signal detected from the operation detection means after an emergency braking is determined by the braking condition determination means, assistance of braking force by the braking force increasing means can be positively discontinued when the driver does not operate the operation member.

Further, the control means includes the operation force detection means for detecting the operation force of the operation member. It also includes the second prohibition means for prohibiting operation of the braking force increasing means when the operation force detected by the operation force detection means is less than the preset operation force after an emergency braking situation is determined by the braking condition determination means. Assistance of braking force by the braking force increasing means can be positively discontinued when the driver does not operate the operation member or the operation is a normal braking operation.

Still further, by estimating the traffic condition of the vehicle using a running time ratio and an average speed derived from the vehicle speed detected by the vehicle speed detection means, and an average lateral acceleration derived from the vehicle speed and the steering wheel angle detected by the steering wheel angle detection means. Further, by estimating the operation tendency intended by the driver using a frequency analysis value of accelerator opening derived from the accelerator opening detected by the accelerator opening sensor, a frequency analysis value of vehicle speed detected by the vehicle speed sensor, a frequency analysis value of a longitudinal direction acceleration derived from the vehicle speed, a frequency analysis value of lateral acceleration derived from the vehicle speed and the steering wheel angle, and the traffic condition estimated by the first estimation means, to change the preset pressure gradient or the second preset pressure gradient, a braking condition by a driver only capable of weak operation force can be distinguished from normal driving, sporty driving, or hard driving.

Yet further, the second estimation means determines frequency distributions of the individual parameters of the accelerator opening, the vehicle speed, the longitudinal direction acceleration, and the lateral acceleration, and estimates the operation tendency based on a weighted total sum of average values and variances of the individual parameters derived from the frequency distributions and the traffic condition estimated by the first estimation means, thereby can be exactly estimated the operation condition of the driver and normal braking or rapid braking can be determined.

These and other objects of the present invention will become more readily apparent from -the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Preferred embodiments of the present invention will now be described in detail with reference to the drawings.

A first embodiment will initially be described.

Figure 1:
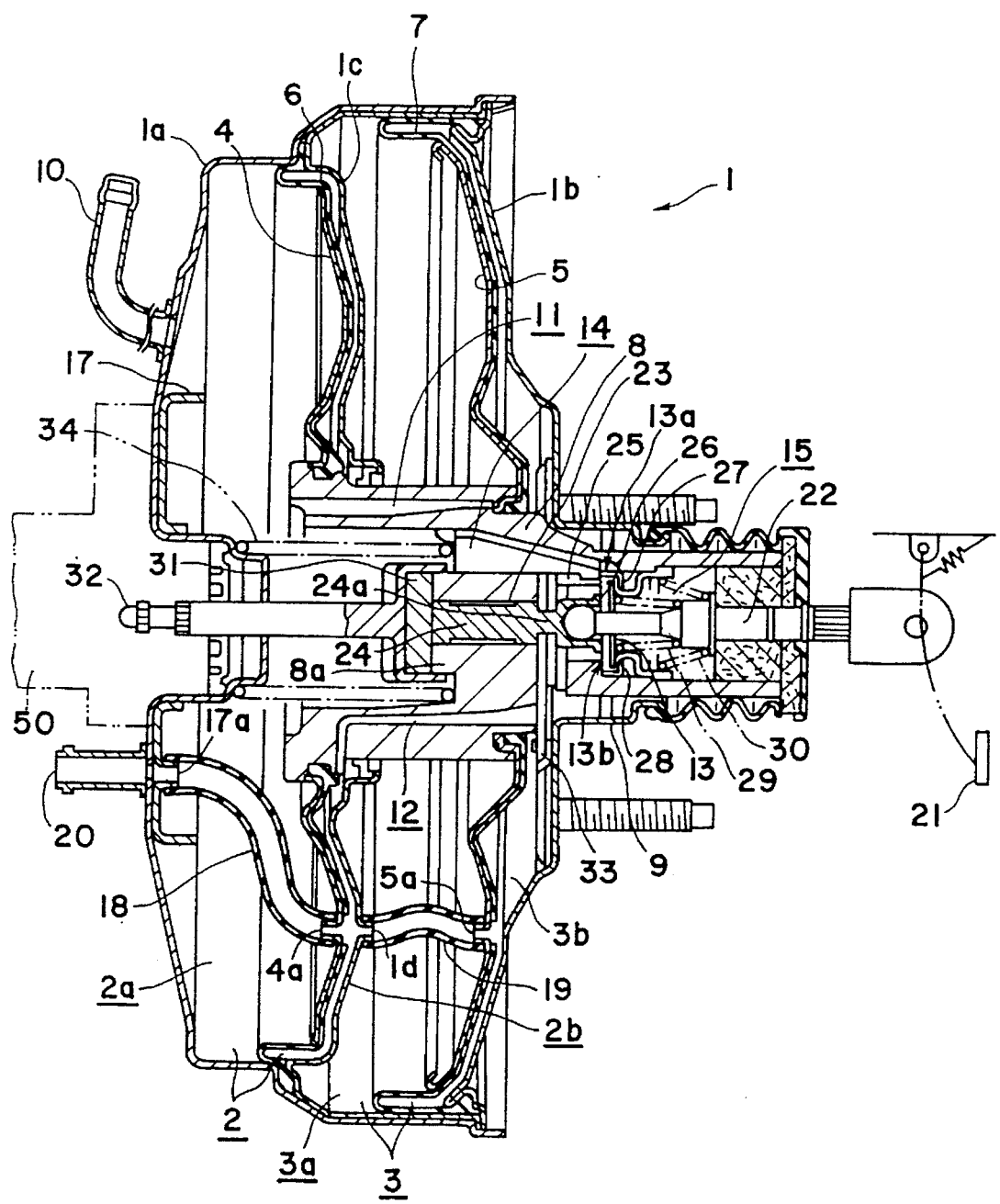
FIG. 1 is a schematic cross sectional view of a negative pressure type brake booster which is applied to individual embodiments of the braking apparatus for a vehicle according to the present invention.

FIG. 1 shows a cross sectional view of a tandem-type negative pressure brake booster 1 to which the rapid braking assist system is applied. In FIG. 1, a brake master cylinder 50 operated by the negative pressure brake booster 1 is mounted on the front surface of a booster shell 1a.

The booster shell 1a is sealed by a rear shell half body 1b, and the rear shell half body 1b is supported on a vehicle body (not shown). The inside of the booster shell 1a is partitioned by a partition plate 1c to a front shell chamber 2 and a rear shell chamber 3.

The front shell chamber 2 is partitioned to form a front negative pressure chamber 2a at the front side and a front atmospheric chamber 2b at the rear side. A front piston 4 is disposed reciprocatably in the longitudinal direction and a front diaphragm 6 is linked to the rear surface of the piston and disposed between the booster shell 1a and the partition plate 1c. Further, and the rear shell chamber 3 is partitioned to a rear negative pressure chamber 3a at the front side and a rear atmospheric chamber 3b at the rear side. A rear piston 5 is disposed reciprocatably in the longitudinal direction and a rear diaphragm 7 is linked to the rear surface of the piston and is disposed between the booster shell 1a and the rear shell half body 1b.

A valve cylinder 6 is mounted at the center of the rear piston 5, the valve cylinder 6 is slidably supported at the center of the partition plate 1c, and slidably supported at a rear extension 9 of the rear shell half body 1b. Further, since the free end of the valve cylinder 8 is fixed to the center of the front piston 4, the front piston 4 and the rear piston 5 operate in synchronization by sliding of the valve cylinder 8.

A reinforcing plate 17 is closely attached to the inner surface of the front negative pressure chamber 2a of the booster shell 1a. The reinforcing plate 17 is provided with a tube connection joint 17a to project to the front negative pressure chamber 2a side. The tube connection joint 17a is connected with an end of a front tube 18 which is flexible and expandable and is capable of preventing centripetal deformation of the tube to the central axis. The other end is connected to a tube connection joint 4a provided to project to the front negative pressure chamber 2a side of the front piston 4.

With the above construction, the front atmospheric chamber 2b communicates with an atmospheric pressure introduction electromagnetic valve and the like (an exhaust valve 41 and an intake valve 42 of FIG. 2 or FIG. 3), which will be described later, through a front tube 18 and an atmosphere introduction tube 20 mounted to the booster shell 1a.

Also, the partition plate 1c and the rear piston 5 are provided with tube connection joints 1d and 5a to project to the rear negative pressure chamber 3a side. The tube connection joints 1d and 5a are connected to each other by a rear tube 19 which is flexible or expandable and is capable of preventing centripetal deformation to the central axis. As a result, the rear atmospheric chamber 3b communicates with the front atmospheric chamber 2b through the rear tube 19, and further with an electromagnetic valve for atmospheric pressure introduction and the like which will be described later.

The front negative pressure chamber 2a is connected to a negative pressure side (not shown) (for example, inside of the intake manifold of the engine) through the negative pressure introduction tube, and communicates with the rear negative pressure chamber 3a through a first port 11 of the valve cylinder 8. Further, the front negative pressure chamber 2a is communicatable with the rear atmospheric chamber 3b through a third port 14 of the valve cylinder 8 and the a control valve 13. The rear atmospheric chamber 3b and the front atmospheric chamber 2b communicate with each other through the rear tube 19 as described above, and also through a second port 12 of the valve cylinder 8. Further, the rear atmospheric chamber 3b selectably communicates in alternation with the front negative pressure chamber 2a through the third port 14 of the valve cylinder 8 or the rear atmospheric chamber 15 at the atmospheric pressure side by changing over the control valve 13.

An input pestle 22 connecting to a brake pedal (operation member) 21 and the brake valve 13 braked thereby are provided in the valve cylinder 8. Further, a valve piston 24 engages a cylinder 23 of a valve cylinder central part 8a at the center of the valve cylinder 8. A front end of the input pestle 22 is swingably mounted to the rear end of the valve piston 24.

An annular first valve seat 23 is formed at the rear end of the valve cylinder central part 8a, and an annular second valve seat 26 is also formed at the rear end of the valve piston 24 surrounded by the first valve seat. A valve body 27 which is slidable with the first valve seat 25 and the second valve seat 26 is provided in the valve cylinder 8. The valve body is, for example, made of rubber and is expandable. Its rear end is supported in close contact with the inner peripheral surface of the valve cylinder 8, and a valve portion 28 is provided opposing the first valve seat 25 and the second valve seat 26 at the front end. As a result, a negative pressure valve 13a is formed of the first valve seat 25 and the valve portion 28, and an atmospheric valve 13b is formed of the valve seat 26 and the valve portion 28, thus forming the control valve 13.

Normally, the valve portion 28 is held in a condition not contacting the first valve seat 25. That is, the negative pressure valve 13a is opened, by the function of a return spring 30 which is held on the inner peripheral surface of the valve cylinder 8 for urging the input pestle 22 to the return side, and contacting with the second valve seat 26 by the function of a valve spring 29 which is compressedly disposed between the valve portion 28 and the input pestle 22 for urging the valve portion 28 towards both valve seats 25 and 26, thereby opening the atmospheric valve 13b. Therefore, when the brake pedal is not operated, the negative pressure valve 13a is opened. Further, the front atmospheric chamber 2b and the rear atmospheric chamber 3b are at the same pressure as the front negative pressure chamber 2a.

When the brake pedal is pressed down and the input pestle 22 moves forward, the valve spring 29 and the valve portion 28 move forward, and the valve portion 28 contacts against the valve seat 25. This closes the negative pressure valve 13a, and the third port 14 of the valve cylinder 8 and the passage between the front atmospheric chamber 2b and the rear atmospheric chamber 3b are shut off.

When the input pestle 22 further moves forward after the negative pressure valve 13a is closed, the valve spring 29 begins to contract along with the valve body 27, and only the valve piston 24 continues to move forward. This separates the second valve seat 26 from the valve portion 28, the atmospheric valve 13b is opened, and atmosphere flows from the atmospheric valve 15 to the rear atmospheric chamber 2b and the rear atmospheric chamber 3b.

A rubber-made elastic piston 31 with its rear surface opposing the valve piston 24 is engaged at the front center of the valve cylinder central part 8a, and an output pestle 32 is engaged to contact against the front surface of the elastic piston 31. The front end of the output pestle 32 is connected to a piston (not shown) of the brake master cylinder 50. Therefore, as the input pestle 22 is moved forward, the valve piston 24 contacts against the elastic piston 31. Then, when it is further moved forward, the pressing force of the input pestle 22 exceeds the elastic limit of the elastic piston 31, the pressing force of the input pestle 22 is transmitted directly to the output pestle 32.

A constricted part 24a at the center of the valve piston 24 is provided peripherally with a stopper plate 33 to have a play in the longitudinal direction of the valve piston 24. The stopper plate 33 moves the valve cylinder 8 forward along with forward movement of the valve piston 24 when the input pestle 22 is pressed to move forward the valve piston 24. On the other hand, when by opening the atmospheric valve 13b, atmosphere is supplied to the front atmospheric chamber 2b and the rear atmospheric chamber 3b, a pressure difference in negative pressure is generated between the front negative pressure chamber 2a and the rear negative pressure chamber 3a, and the front piston 4 and the rear piston 5 are urged to the front, the output pestle 32 can be moved forward through the valve piston 24.

A valve cylinder return spring 34 to provide the front and rear pistons 4 and 5 with a return force is compressedly disposed between the valve cylinder central part 8a and the booster shell 1a. When no pressure difference is generated between the front negative pressure chamber 2a and the front atmospheric chamber 2b and the rear negative pressure chamber 3a and the rear atmospheric chamber 3b, the rear pistons 4 and 5 along with the valve cylinder 8 are always positioned at a retreat limit.

Next, an embodiment in which the negative pressure brake booster 1 of the above construction is applied to a rapid braking assist system will be described with reference to FIG. 2 and FIG. 3.

Figure 2:
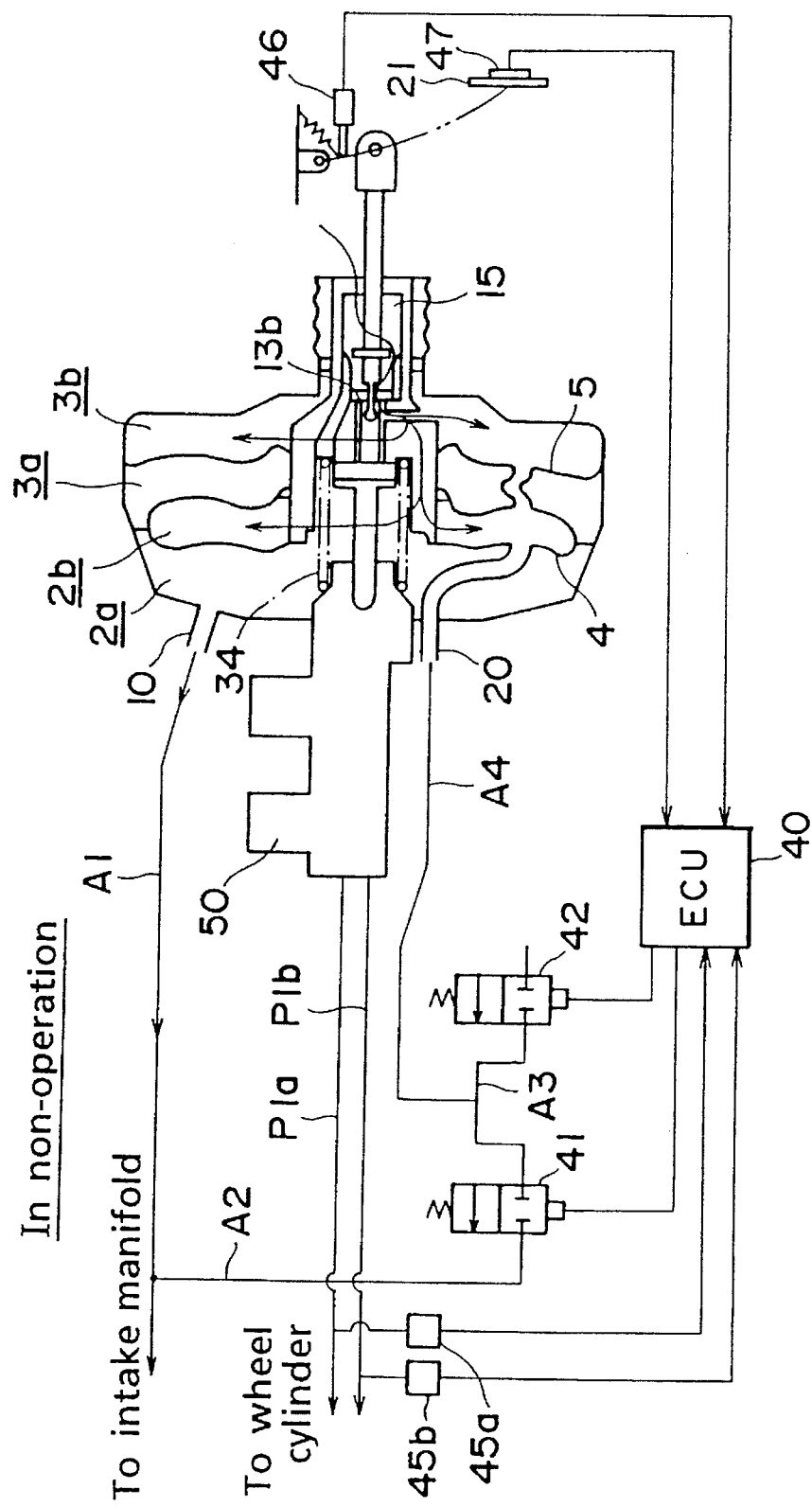
FIG. 2 is a schematic view showing a first embodiment of the braking apparatus for a vehicle of the present invention in non-operation.
Figure 3:
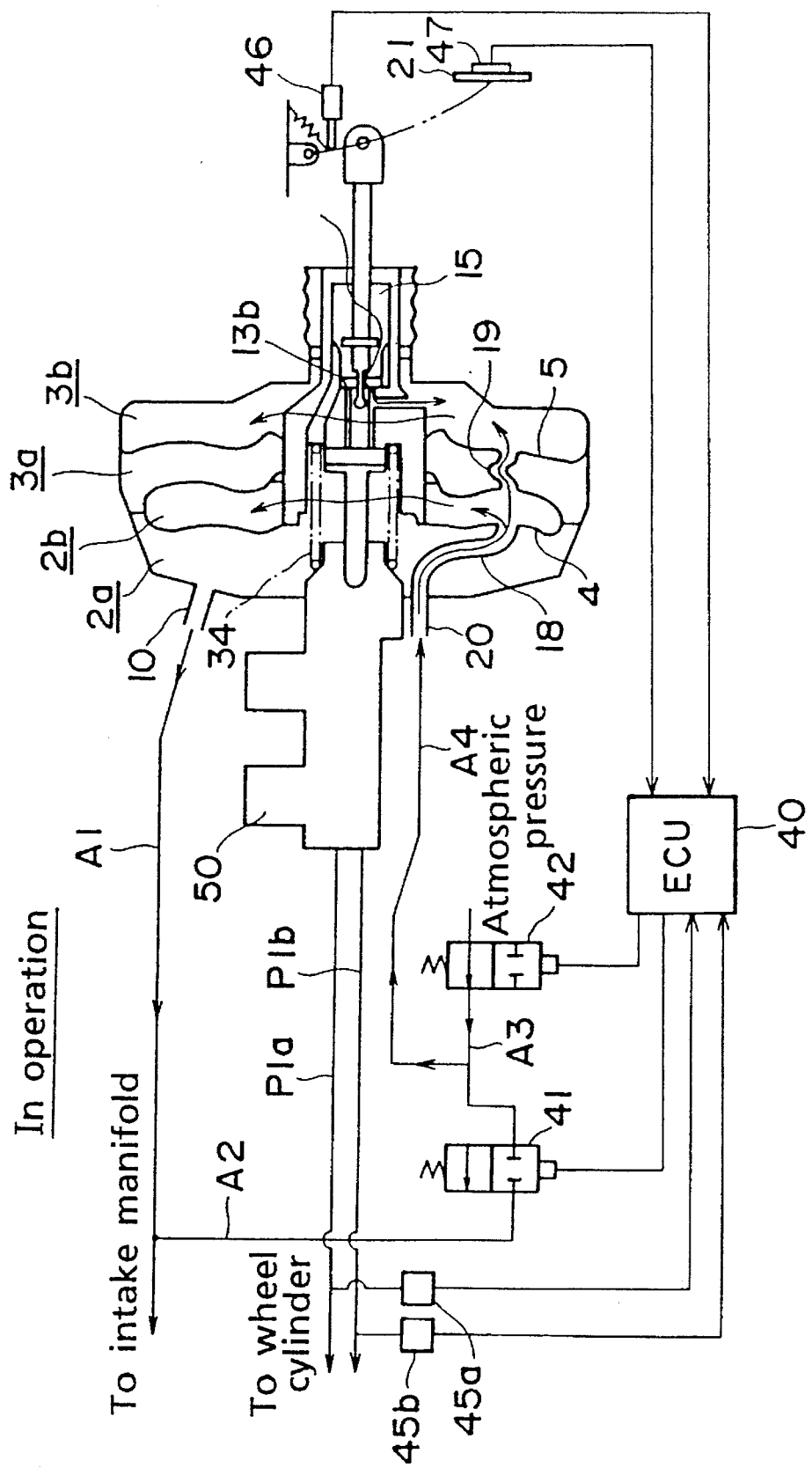
FIG. 3 is a schematic view showing the first embodiment of the braking apparatus for a vehicle of the present invention in operation.

As shown in FIG. 2, the negative pressure introduction tube 10 of the negative pressure brake booster 1 is connected to a vessel A1, and to a negative pressure source (inside the intake manifold). An air passage A2 is branched from the vessel A1, and the air passage A2 is connected to an exhaust valve 41 as an electromagnetic valve which is closed when unenergized. Further, the exhaust valve 41 is connected to an air passage A3, and an end thereof is connected to an intake valve as an electromagnetic valve which is closed when unenergized. An air passage A4 is branched from the air passage A3, and the air passage A4 is connected to the atmosphere introduction tube 20 of the negative brake booster 1.

From the tandem-type brake master cylinder 50 connected to the front of the negative pressure brake booster 1 extend oil passages P1a and P1b, which are individually connected ultimately to a wheel cylinders (not shown) (e.g. reference numerals 71–74 in FIG. 8 or FIG. 9 which will be described later). Hydraulic pressure sensors 45a and 45b as pressure detection means are individually connected halfway in the oil passages P1a and P1b.

The brake pedal 21 connected to the input pestle 22 of the negative pressure brake booster 1 is provided with a brake SW (brake lamp SW and the like) which is mounted as operation detection means to detect the operation of the brake pedal 21 and the pressing force sensor 47 as operation force detection means. The pressing force sensor 47 uses a pressing pressure sensor such as pressing pedal type variable resistor, and is mounted at nearly the center of the brake pedal 21 of the driver side to be positively pressed.

Figure 4:
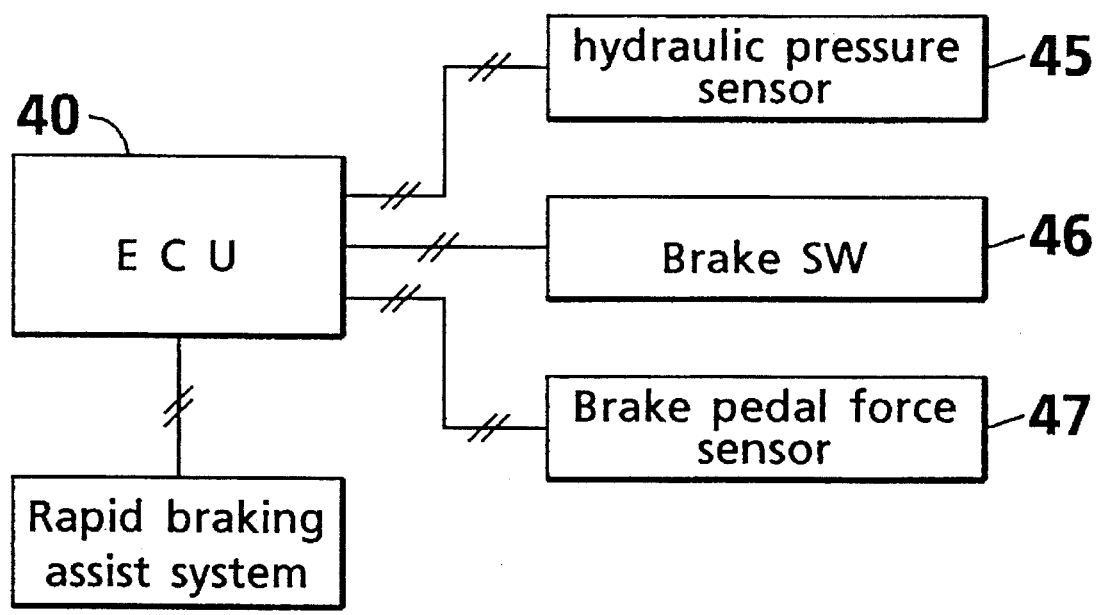
FIG. 4 is a block diagram showing a control system of the first embodiment and a second embodiment of the braking apparatus for a vehicle.

At the input side of an electronic control unit ECU 40 provided on the vehicle, as shown in the block diagram of FIG. 4, the hydraulic pressure sensors 45a and 45b, the brake SW 46, the pressing force sensor 47 and the like are connected. Further, at the output side, a solenoid unit of the exhaust valve 41 and the intake valve 42 of the rapid braking assist system are connected.

Next, operation of the rapid braking assist system of the above construction will be described.

Figure 5:
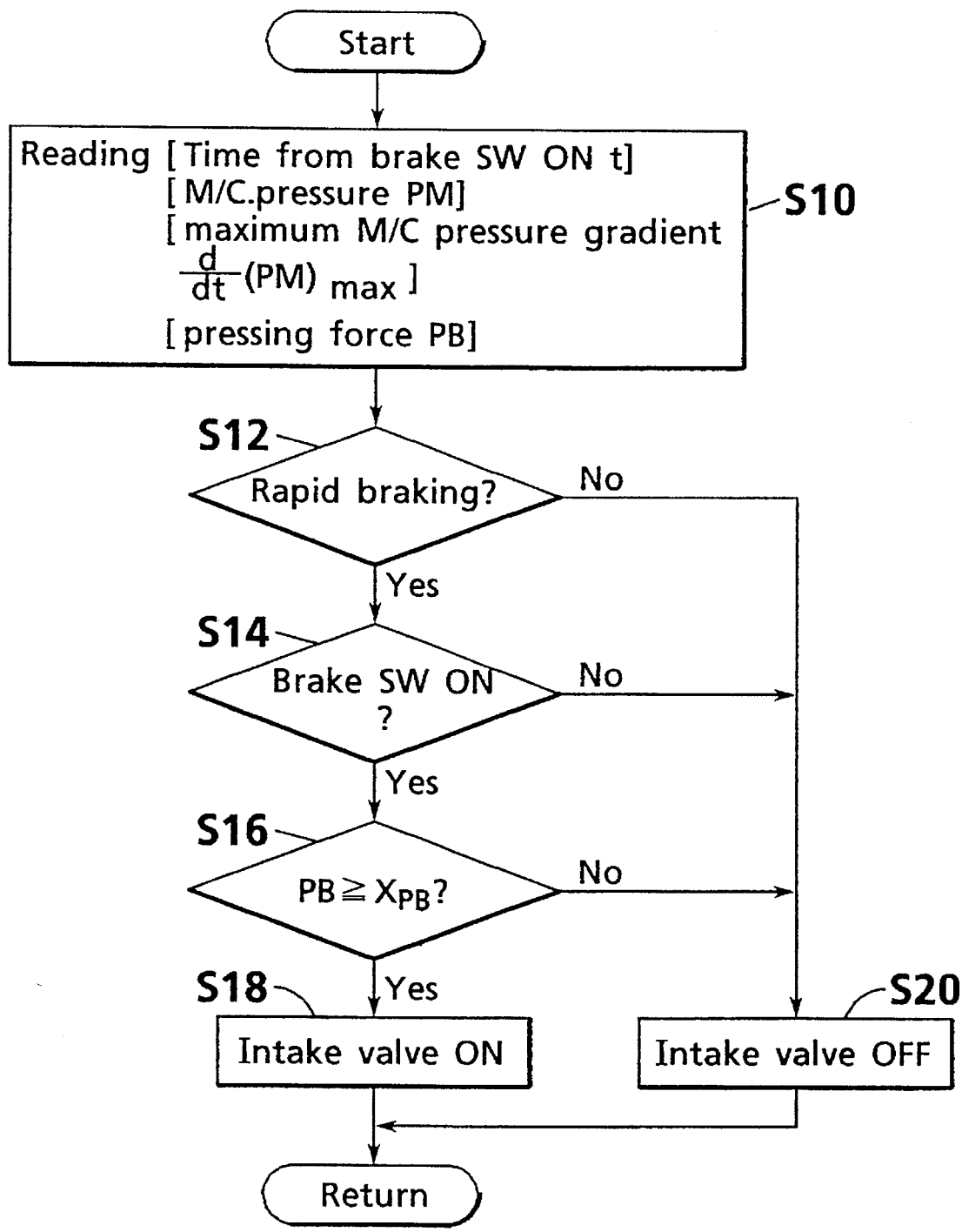
FIG. 5 is a flow chart showing the control routine of the first embodiment and the second embodiment of the braking apparatus for a vehicle.

FIG. 5 shows a routine for controlling the rapid braking assist system which functions as braking condition determination means and control means. First, in step S10, determination data for determining whether or not rapid braking is a condition to operate the rapid braking assist system (a condition when a driver applying a weak pressing force performs rapid braking) is read to a storage device. In this case, a time lapse t after the brake SW 46 detects operation of the pedal, M/C pressure PM as a hydraulic pressure of M/C (master cylinder) detected by the hydraulic pressure sensors 45a and 45b connected to the output side of the brake master cylinder 50, maximum M/C pressure gradient d(PM)/dtmax, and a pressing force PB from the pressing force sensor 47 are read. These values are read at every execution period (e.g. 5 msec) of the routine.

Reading the maximum M/C pressure gradient d(PM)/dtmax is made such that the greatest value of M/C pressure gradient d(PM)/dtmax according to M/C pressure PM detected by the hydraulic pressure sensors 45a and 45b is determined which is stored as the maximum M/C pressure gradient d(PM)/dtmax, execution of the routine is repeated and, if the maximum M/C pressure gradient d(PM)/dtmax is greater than that value, the value is updated as a new maximum M/C pressure gradient d(PM)/dtmax.

Figure 6:
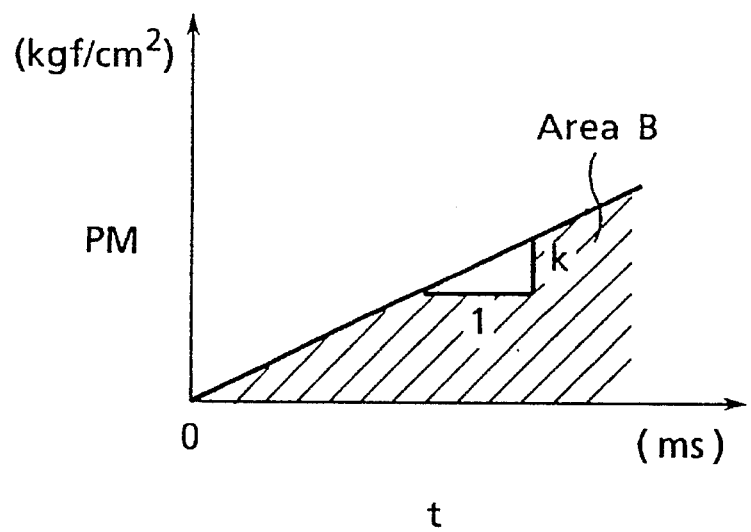
FIG. 6 is a graph showing the relationship between time lapse and M/C pressure PM used in rapid braking determination in the control routine of FIG. 5.
Figure 7:
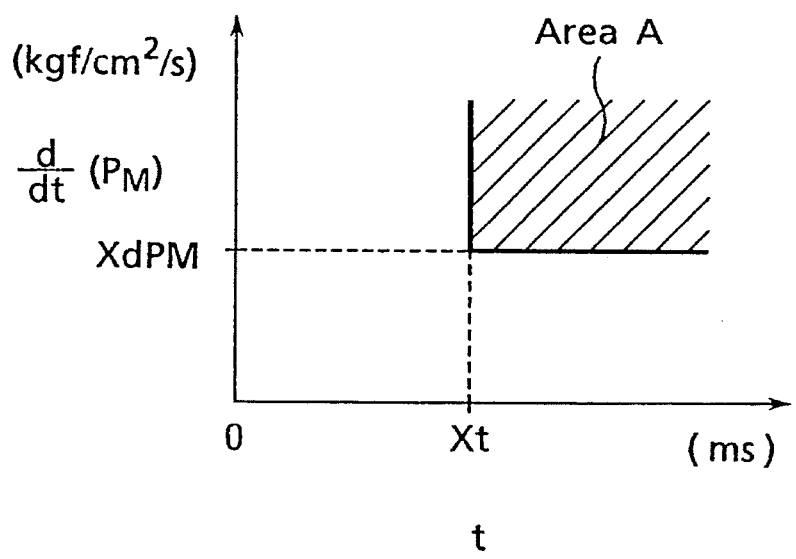
FIG. 7 is a graph showing the relationship between time lapse and M/C pressure gradient d(PM)/dt used in rapid braking determination in the control routine of FIG. 5.

Next, in step S12, where a determination is made as to whether or not rapid braking by a driver of weak pressing force is executed. In the rapid braking determination, it is determined whether or not the determination data read in step S10 are within hatched area A and area B shown on the map of FIG. 6 and FIG. 7. That is, in the map of FIG. 6, it is determined whether or not M/C pressure PM and time lapse t are within formula (1), and in the map of FIG. 7, it is determined whether or not the maximum M/C pressure gradient d(PM)/dtmax and the time lapse t are within formula (2).

$$PM < k-1 \quad (1),$$

$$d(PM)/dtmax > Xdpm, \ t > Xt \quad (2),$$

where k is a constant of proportion, for example, 250 (kgs/cm²/sec). A predetermined value XdPM is, for example, 300 (kgf/cm²/sec), and predetermined time Xt is, for example, 100 (msec). The values of k, XdPM, Xt and the like are based on experimental data by a driver capable of applying only a weak brake pedal pressing force, in which the brake hydraulic pressure is hard to increase after the beginning of braking operation. However, after the lapse of the predetermined time Xt, the brake pressure rapidly increases which can be regarded as rapid braking. These threshold values are varied with the subject condition.

When the determination result in step S12 is No, and the read values are at least out of either of the determination areas (area A or area B) of (1) or (2), the processing proceeds to step S20, where the intake valve 42 is remained OFF and the rapid braking assist system is not operated.

On the other hand, when the determination result is Yes, and rapid braking condition by a driver applying a weak pressing force is determined, the processing proceeds to step S14. In step S14, whether or not the brake pedal pressed down is determined by whether or not the signal of the brake SW 46 is ON. Even when rapid braking is determined by the determination in step S12, when braking is not performed after that, the brake SW 46 is OFF, and the determination result is No. The processing proceeds to step S20, where the intake valve 42 is turned off, and the rapid braking assist system is not operated (first prohibition means). On the other hand, when the determination result is Yes, and the signal of the brake SW 46 is ON, the processing proceeds to step S16.

In step S16, a determination is made as to whether or not the brake pressing force PB read in step S10 is more than a predetermined value XPB. The predetermined value XPB is set for a driver applying the weakest brake pressing force according to experimental data similar to the above threshold values. Even if a rapid braking condition is determined by the determination in step S12 and step S14, when the determination result is No, it can be determined that the brake pressing force is relatively weak and it is not a rapid braking condition. The processing proceeds to step S20 similar to step S14, where the intake valve 42 is turned off and the rapid braking assist system is not operated (second prohibition means). On the other hand, when the determination result is Yes, it can be regarded as a rapid braking condition. The processing proceeds to step S18, where the intake valve 42 is turned on to begin operation of the rapid braking assist system. Further, atmosphere is supplied to the front atmospheric chamber 2b and the rear atmospheric chamber 3b of the negative pressure brake booster 1.

FIG. 2 shows a condition in which one of determinations in steps S12, S14; and S16 of the rapid braking assist system control routine is determined to be No, the intake valve 42 is OFF, and the rapid braking assist system is in non-operation. That is, a normal operation condition of the negative pressure brake booster 1 is determined, and the atmosphere valve 13b is opened. In this case, since the intake valve 42 is already opened, by the opening of the atmosphere valve 13b, atmosphere flows from the rear atmospheric chamber 15 into the front atmospheric chamber 2b and the rear atmospheric chamber 3b, the front piston 4 and the rear piston 5 are pressed towards the negative pressure chambers 2a and 3a side due to the pressure difference between the atmospheric chambers 2b and 3b and the front negative pressure chamber 2a and the rear negative pressure chamber 3a, and the brake force is normally assisted.

When the brake pedal 21 is not operated or immediately after operation of the brake pedal 21, since the negative pressure valve 13a is opened and the atmosphere valve 13b is closed as described above, the atmospheric chambers 2b and 3b are maintained at the same pressure as the negative pressure chambers 2a and 3a with no pressure difference. Further, the front piston 4 and the rear piston 5 are retreated to the retreat limit by the force of the valve cylinder return spring On the other hand, when all determinations of steps S12, S14, and S16 are Yes, the intake valve 42 is ON, and the rapid braking assist system is in operation, as shown in FIG. 3. The intake valve 42 is urged and opened, and atmosphere flows in the front atmospheric chamber 2b through the atmosphere introduction tube 3b and the tube 18, and further forcibly flowed into the rear atmospheric chamber 3b through the tube 19 (shown by the arrow). As a result, a pressure difference is rapidly generated between the front negative pressure chamber 2a and the front atmospheric chamber 2b and between the rear negative pressure chamber 3a and the rear atmospheric chamber 3b. Further, the front piston 4 and the rear piston 5 are both urged to the negative pressure side, that is, the side to make braking, thereby forcibly assisting the braking force. In this case, when the atmosphere valve 13b is opened as shown in the Figure, atmosphere flows from the rear atmospheric chamber 15 (shown by the arrow), and the braking force is even further assisted.

In this case, it is possible to make fine adjustment of the pressure acting upon the atmospheric chambers 2b and 3b by opening the exhaust valve 41 simultaneously with opening of the intake valve 42 to escape part of atmosphere flowing from the intake valve 42 to the negative pressure source side.

Since the forced supply of atmosphere is determined immediately after the brake pedal is pressed down, that is, while the negative pressure valve 13a is opened, when the atmosphere valve 42 is opened, the atmospheric chambers 2b and 3b communicate with the negative pressure side through the negative pressure valve 13a, the pressure acting upon the atmospheric chambers 2b and 3b is lower than the atmospheric pressure. However, in a rapid braking condition, since the time when the negative pressure valve 13a is opened is very short, the negative pressure valve 13a is momentarily opened. Further, communication of the atmospheric chambers 2b and 3b with the negative pressure side is shut off, and assistance of the braking force is sufficiently performed.

As described above, by opening the intake valve 42 to forcibly supply atmosphere to the atmospheric chambers 2b and 3b, a sufficient braking force can be obtained even when a driver capable of applying only a weak pressing force makes rapid braking.

In the present embodiment, the pressure acting upon the atmospheric chambers 2b and 3b is assumed as atmospheric pressure. However, alternatively, the intake valve 42 may be connected to an air compressor or the like to exert a pressure more than atmospheric pressure on the atmospheric chambers 2b and 3b when the intake valve 42 is opened. This thereby even further increases the assistance of braking force.

Further, as the booster, the negative pressure brake booster is used in which a negative pressure is exerted on the negative pressure chambers 2a and 2b, and atmospheric pressure (positive pressure) is applied to the atmospheric chambers 2b and 3b. However, alternatively, a positive pressure booster may be used in which the parts of negative pressure chambers 2a and 2b correspond to atmospheric chambers, and the parts of atmospheric chambers 2b and 3b correspond to positive pressure chambers. When a rapid braking condition is detected, a positive pressure higher than normal braking is applied to assist the braking force.

Next, as a second embodiment, a case in which the above rapid braking assist system control is applied to another rapid braking assist system (brake hydraulic pressure system) will be described.

Figure 8:
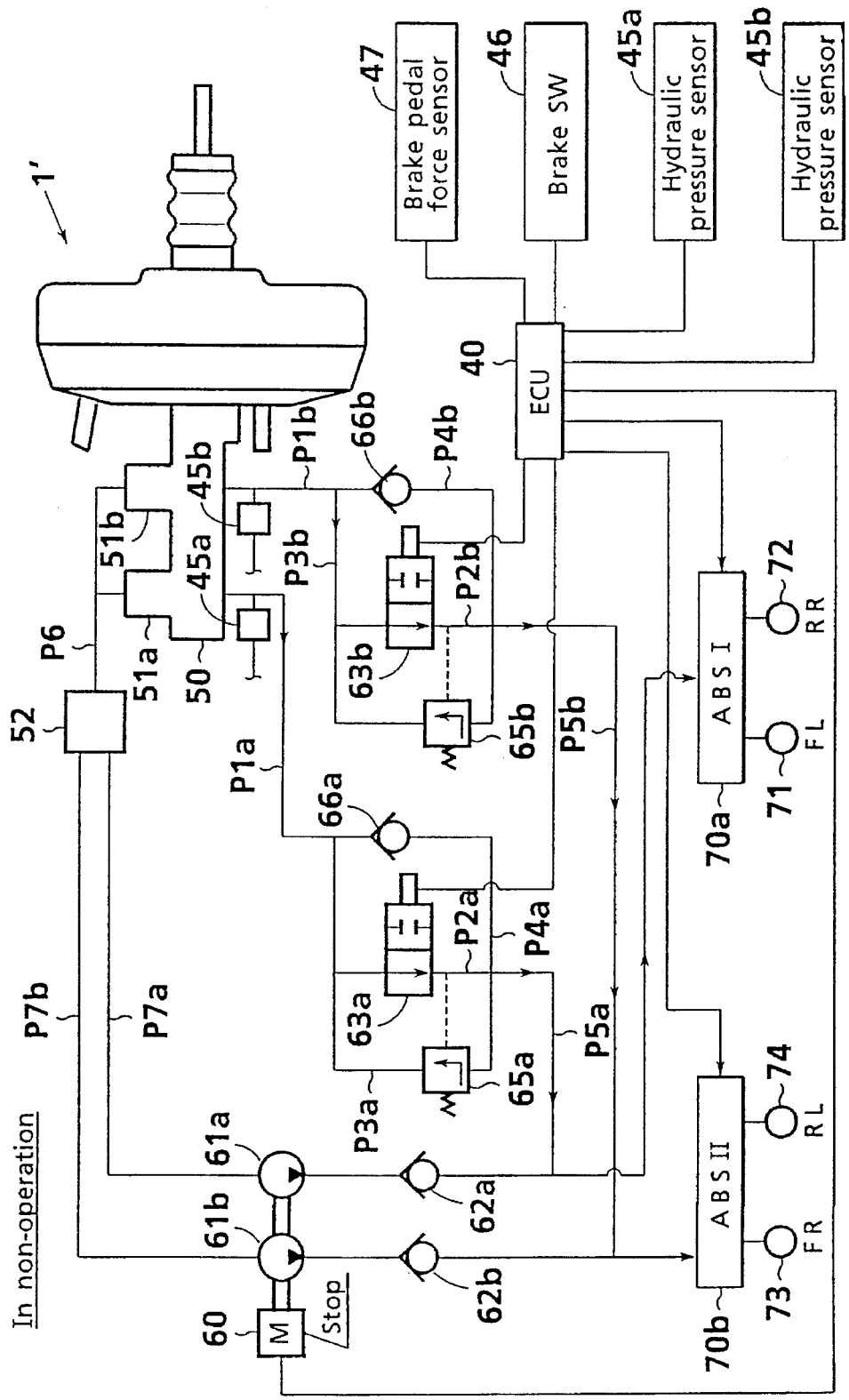
FIG. 8 is a schematic view showing the second embodiment of the braking apparatus for a vehicle in non-operation.

As shown in FIG. 8, output ports disposed at two positions of the tandem-type brake master cylinder 50 provided at the front of the ordinary negative pressure brake booster 1 are connected individually to the oil passage P1a and the oil passage P1b. The hydraulic pressure sensors 45a and 45b are disposed in the oil passages P1a and P1b.

The oil passages P1a and P1b are individually branched; the oil passage P1a divided into oil passages P2a, P3a, and P4a, and the oil passage P1b divided into oil passages P2b, P3b, and P4b. The oil passages P2a and P2b are provided with change-over valves 63a and 63b which are normally-open electromagnetic valves, and the oil passages P2a and P3b are provided with pressure valves 65a and 65b which release hydraulic pressures of the oil passages P2a and P2b as pilot pressures. Further, the oil passages P4a and P4b are provided with check valves 66a and 66b.

The oil passages P2a, P3a, and P4a and the oil passages P2b, P3b, and P4b are joined and connected to oil passages P5a and P5b, and to the individual wheel cylinders 71–74 through ABS-I 70a and ABS-II 70b which are valve units constituting the individual ABS systems. The ABS-I 70a is connected to the wheel cylinder FL 71 and the wheel cylinder RR 72, and the ABS-II 70b is connected to the wheel cylinder FR 73 and the wheel cylinder RL 74. The ABS-I 70a and ABS-II 70b which are valve units constituting the ABS systems are known systems, and detailed description thereof is omitted.

On the other hand, oil reservoir cylinders 51a and 51b provided in the tandem-type brake master cylinder 50 are connected to a reserve tank 52 through the oil passage P6, and the reserve tank 52 is connected with oil passages P7a and P7b. The oil passages P7a and P7b are provided with pumps 61a and 61b which are operated by a driver motor 60, and check valves 62a and 62b are disposed at the downstream. The oil passages P7a and P7b join with the oil passages P5a and P5b at the downstream of the check valves 62a and 62b.

At the input side of the ECU 40, as shown in the block diagram of FIG. 4 described in the first embodiment, in addition to the hydraulic pressure sensors 45a and 45b, the brake SW 46, and the pressing force sensor 47, sensors required for operation of the ABS-I 70a and the ABS-II 70b are connected. Further, at the output side, in addition to the solenoid units of the change-over valves 63a and 63b of the rapid braking assist system, solenoid units of individual electromagnetic valves (not shown) of the ABS-I 70a and the ABS-II 70b are connected.

Next, functions of the rapid braking assist system of the above construction will be described.

Also in the second embodiment, the rapid braking assist system control executes the routine of FIG. 5 described in the first embodiment. However, step S18 is replaced with a step in which the change-over valves 63a and 63b and the motor 60 are ON, and step S20 is replaced with a step in which the change-over valves 63a and 63b and the motor 60 are OFF.

The rapid braking assist system control routine is executed, by the determinations in steps S12, S14, and S16, the brake pedal 21 is not operated and braking is not performed. Alternatively, when a normal braking is determined in which the system is not operated at the time the braking is started, in step S20, the change-over valves 63a and 63b and the motor 60 are OFF, the rapid braking assist system is not operated.

In this case, as shown in non-operation in FIG. 8, the change-over valves 63a and 63b are not supplied with drive signal of the ECU 40 and both are opened, hydraulic pressure from the output port of the brake master cylinder 50 is supplied directly to the individual wheel cylinders 71, 72, 73, and 74 through the ABS-I 70a and the ABS-II 70b. Further, since the motor 60 is not supplied with the drive signal, the pumps 61a and 61b are not operated.

In this case, when oil passes through the opened change-over valves 63a and 63b, and the hydraulic pressure in the oil passages P2a and P2b reaches the predetermined pilot pressure, the pressure valves 65a and 65b are opened, the oil passages P2a and P3b are used as oil passages along with the oil passages P2a and P2b to increase the flow rate, and the braking force is further increased. High-pressure oil of the oil passages P5a and P5b supplied from the brake master cylinder 50 does not flow back to the reserve tank 52 by the function of the check valves 62a and 62b.

On the other hand, when, by the determinations in steps S12, S14, and S16 of the rapid braking assist system control routine, braking force assist is determined to be necessary, in step S18, the change-over valves 63a and 63b and the motor 60 are ON to begin operation of the rapid braking assist system.

Figure 9:
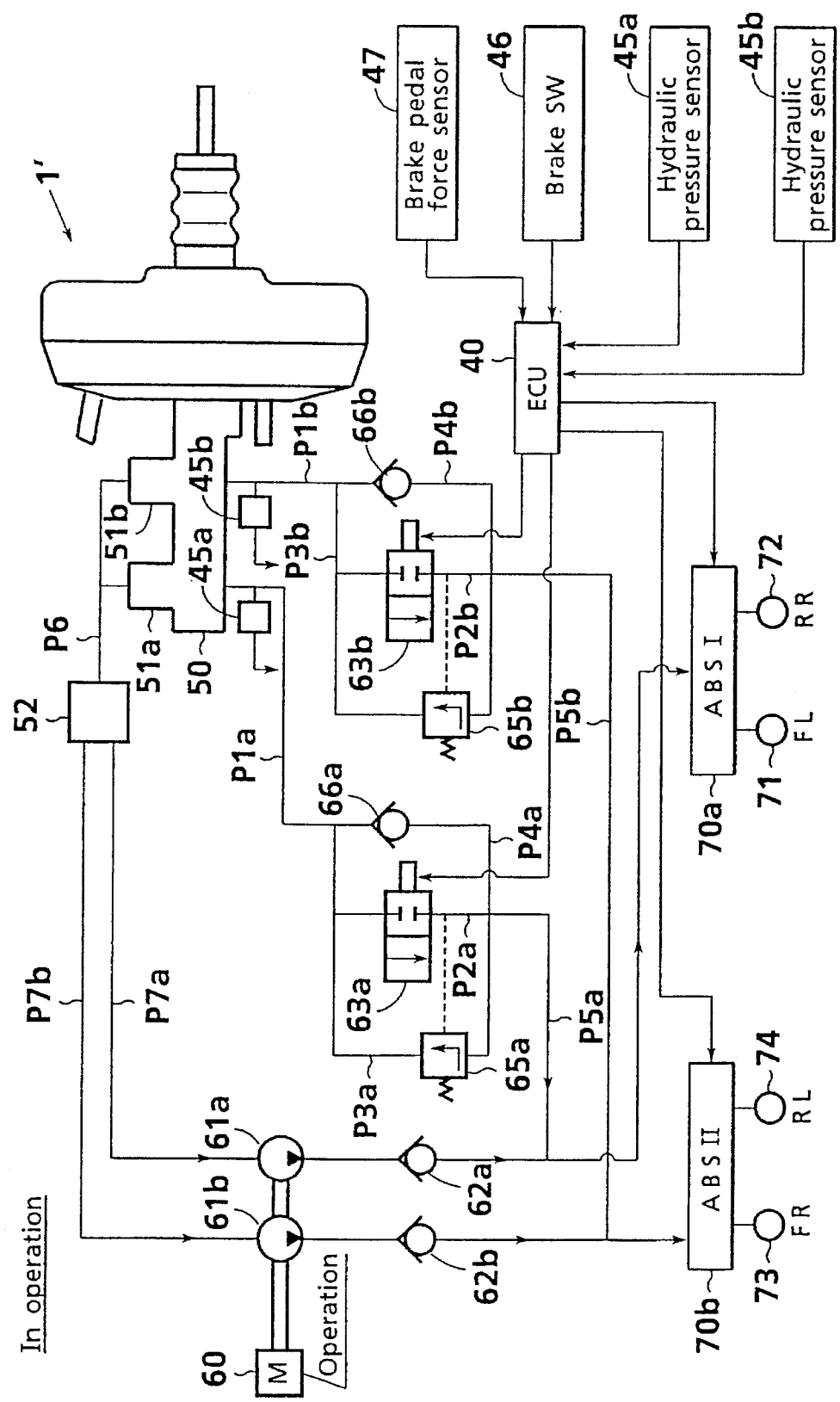
FIG. 9 is a schematic view showing the second embodiment of the braking apparatus for a vehicle in operation.

In this case, as shown in FIG. 9 in operation, the change-over valves 63a and 63b are supplied with the drive signal and opened, the motor 60 is operated to operate the pumps 61a and 61b, and the individual wheel cylinders 71, 72, 73, and 74 are supplied with the discharge pressure of the pumps 61a and 61b through the ABS-I 70a and the ABS-II 70b. Discharge pressure of the pumps 61a and 61b is preset to a pressure required and sufficient for executing the rapid braking, thereby obtaining a sufficient braking force even by a driver capable of applying only a weak brake pressing force.

At this moment, hydraulic pressure of the oil passage P1a and P1b is lower than that of the oil passages P5a and P5b. However, after the brake pedal 21 is pressed further strongly after the operation of the assist system, hydraulic pressure of the oil passages P1a and P1b overcomes the discharge pressure of the pumps 61a and 61b, and becomes higher than the hydraulic pressure of the oil passages P5a and P5b, oil flows to the ABS-I 70a and ABS-II 70b through the check valves 66a and 66b.

The ABS-I 70a and the ABS-II 70b, when a predetermined condition is detected, is supplied with a predetermined drive signal from the ECU 40 to operate, which can further enhance the effect of the rapid braking assist system. However, since the functions of the ABS system are known in the art, detailed description thereof is omitted.

In the control in the above embodiments (first embodiment and second embodiment), M/C pressure PM and maximum M/C pressure gradient d(PM)/dtmax are used in combination as the determination criteria, which may be determination only by the maximum M/C pressure gradient d(PM)/dtmax.

The maximum M/C pressure gradient d(PM)/dtmax from the brake master cylinder 50 is mainly used as a means for determining a rapid braking condition by a driver applying a weak brake pressing force. A similar effect can be obtained when the maximum pressing force PB max (maximum operation force) based on the brake pedal pressing force (operation force) PB detected by the pressing force sensor 47 is mainly used to make determination. In this case, in reading the maximum pressing force PBmax, as in the case of the maximum M/C pressure gradient d(PM)/dtmax, a maximum value of the detected pressing force PB is determined and stored as the maximum pressing force PBmax. When execution of the rapid braking assist system control routine is repeated and the pressing force PB is greater than that value, the maximum pressing force PBmax is updated to that value.

Further, the sensor for detecting the rapid braking condition is not limited to the hydraulic pressure sensor, brake SW, and pressing force sensor used in the above embodiments. For example, a scan-type laser radar mounted at the front end of the vehicle, a wheel speed sensor, a steering angle sensor mounted on the steering unit, and the like may be used.

Still further, ABS systems (ABS-I 70a and ABS-II 70b) similar to those in the second embodiment may be applied to the rapid braking assist system of the first embodiment, which can further improve the brake performance.

Next, a third embodiment of the present invention will be described in detail.

A double brake operation is sometimes made in which the driver presses the brake pedal to retard the vehicle, the brake pedal is slightly returned, and then the brake pedal is pressed again to stop the vehicle. Brake operation and operation of the brake pedal switch are not completely in line with each other and, in such double braking, the brake pedal switch is continuously ON. Therefore, there can be a case in which braking is started before resetting. The third embodiment achieves determination of rapid braking in consideration of such double a brake operation.

Figure 10:
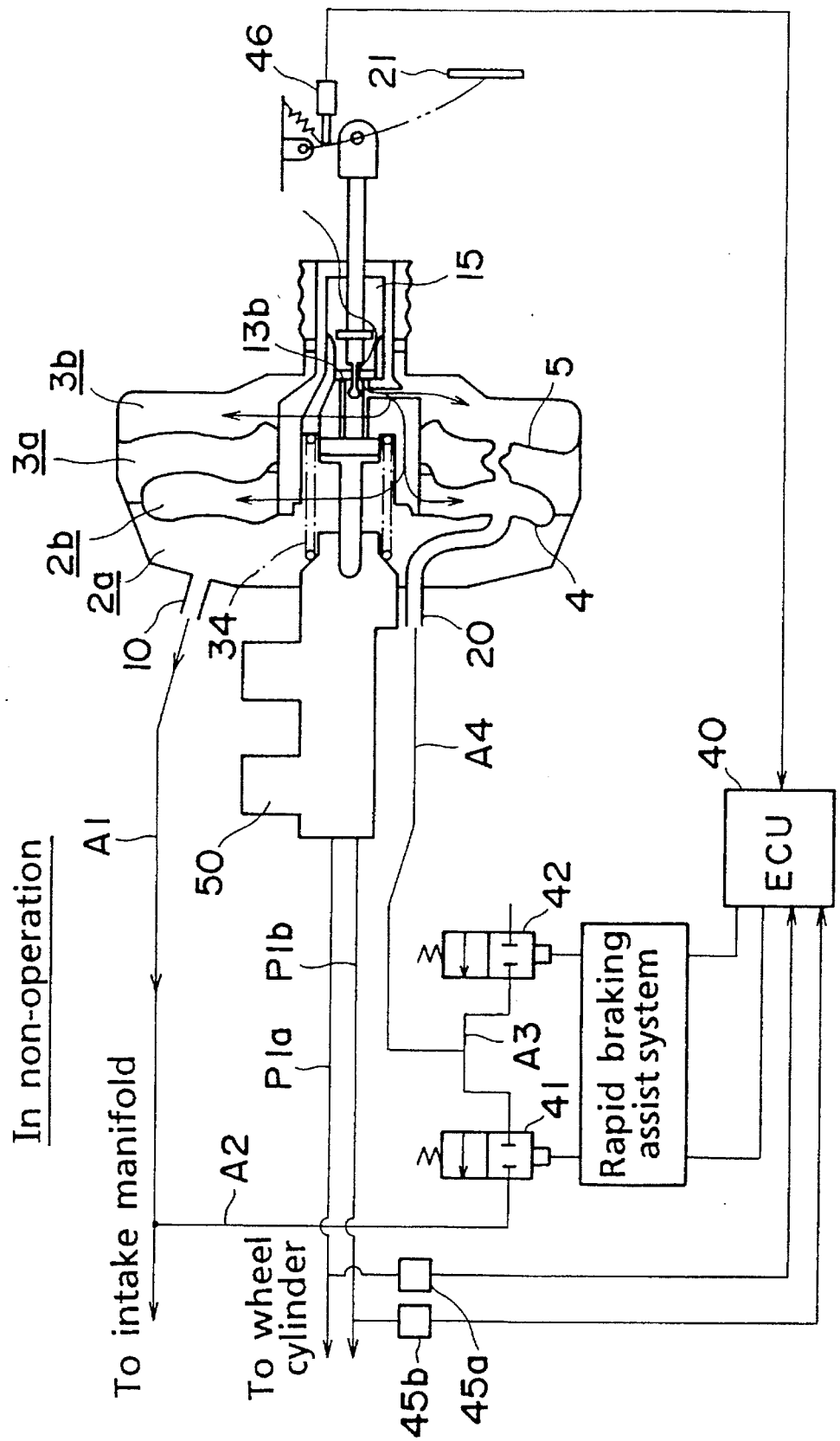
FIG. 10 is a schematic view showing the third embodiment of the braking apparatus for a vehicle in non-operation.
Figure 11:
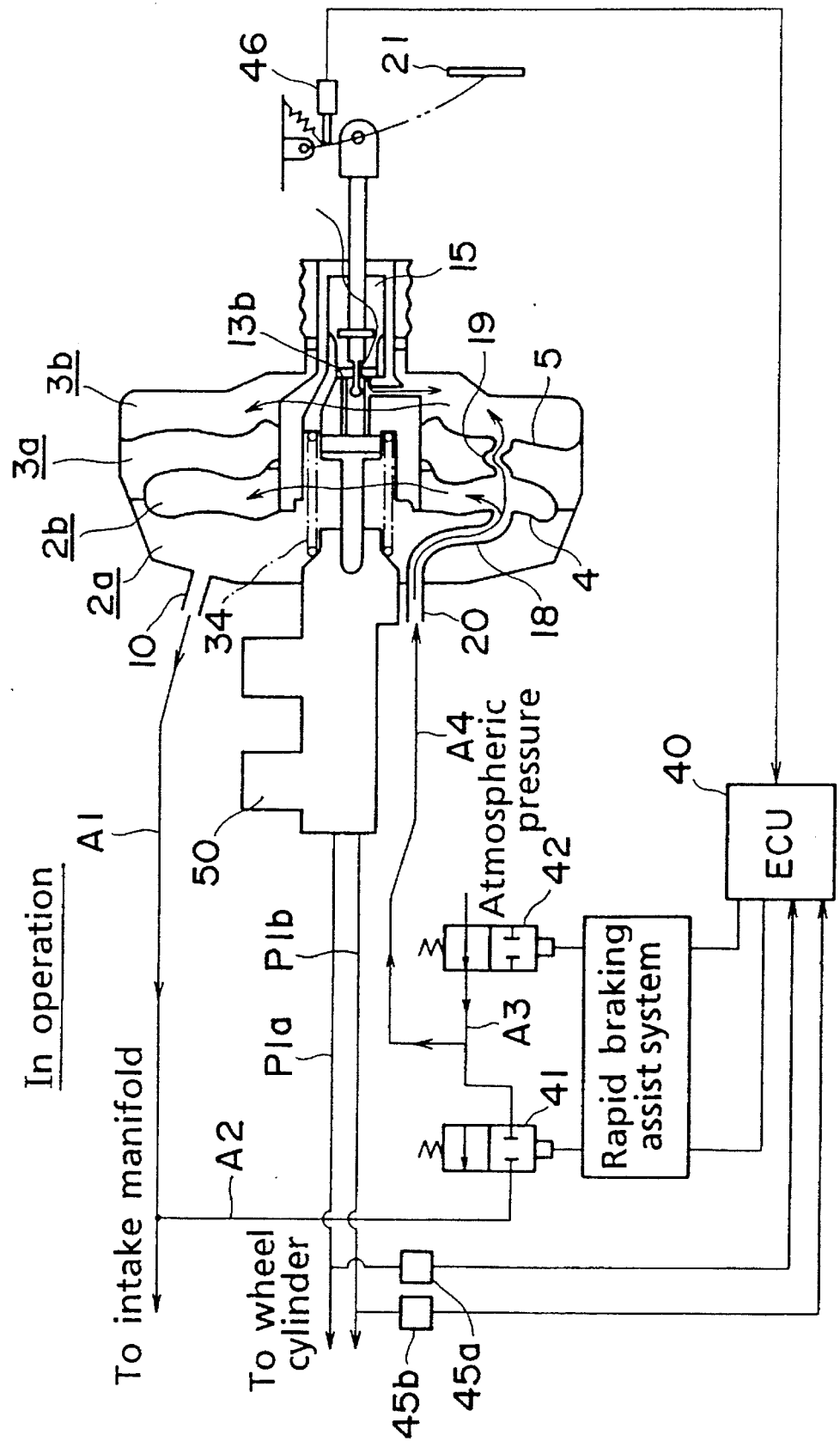
FIG. 11 is a schematic view showing the second embodiment of the braking apparatus for a vehicle in operation.
Figure 12:
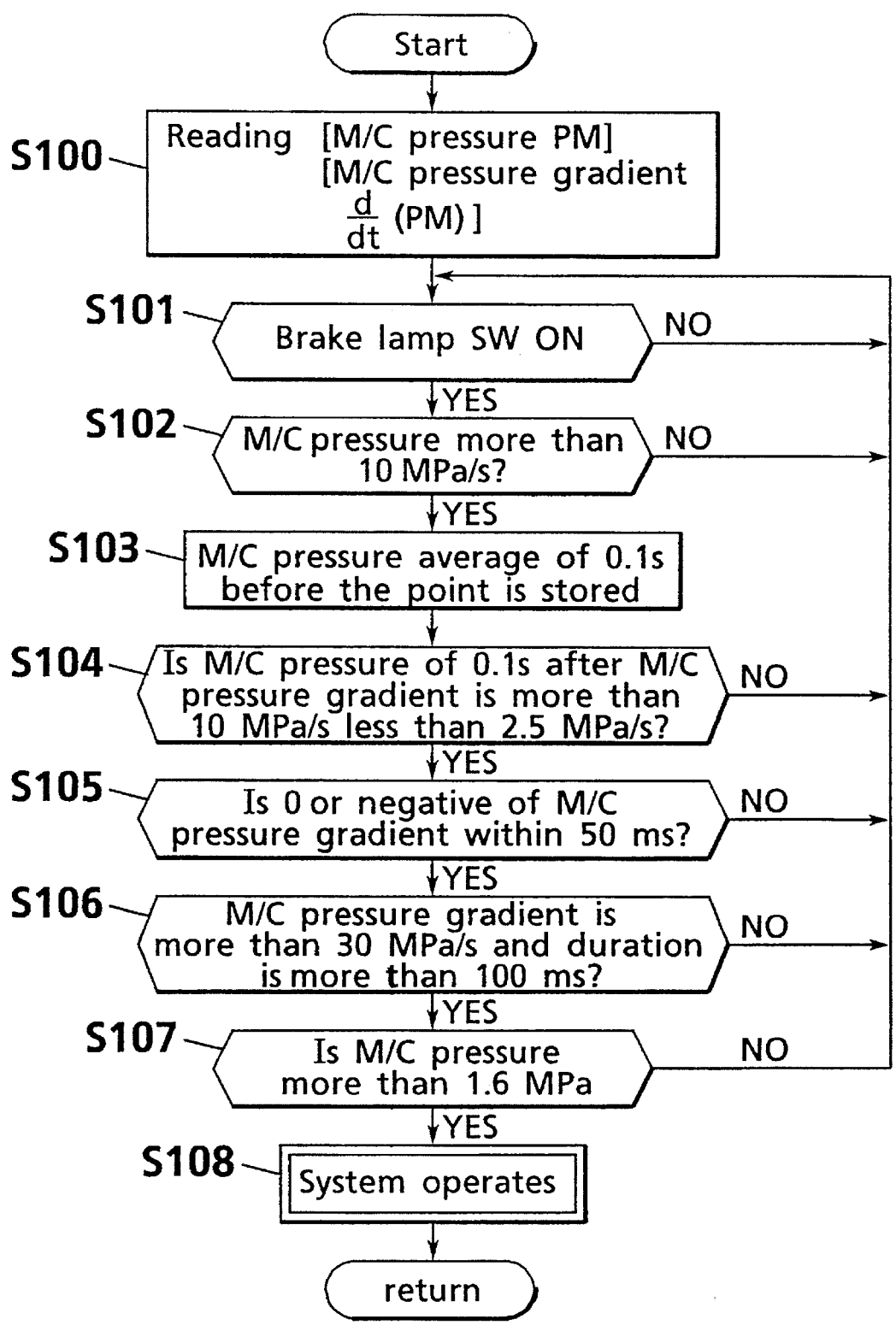
FIG. 12 is a flow chart showing the control routine of the third embodiment and a fourth embodiment of the braking apparatus for a vehicle.
Figure 13:
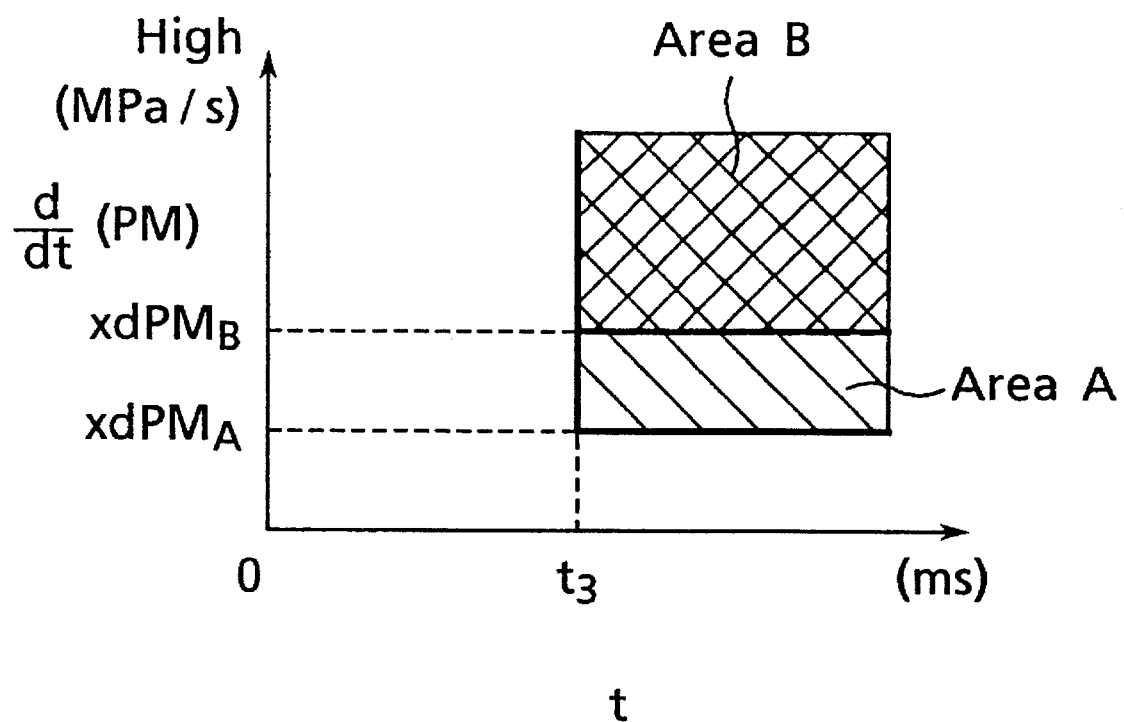
FIG. 13 is a graph showing the relationship between the time lapse and M/C pressure gradient d(PM)/dt used in rapid braking determination in the control routine of FIG. 12.
Figure 14A:
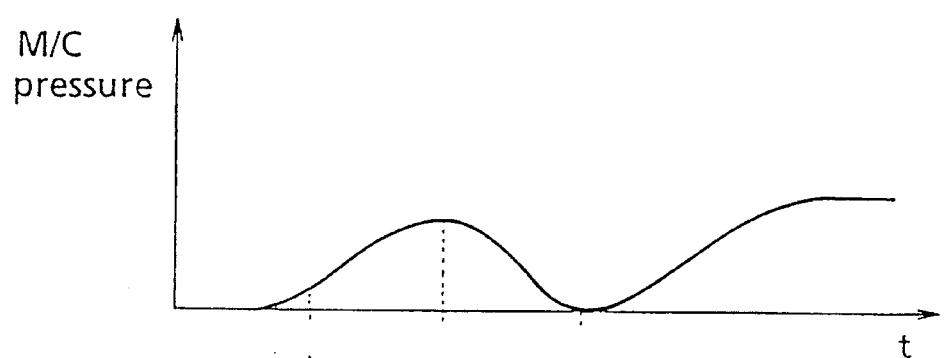
FIG. 14 is a graph showing changes of M/C pressure gradient d(PM)/dt relative to time lapse and the operation condition of the brake lamp switch in the third and fourth embodiments.
Figure 14B:
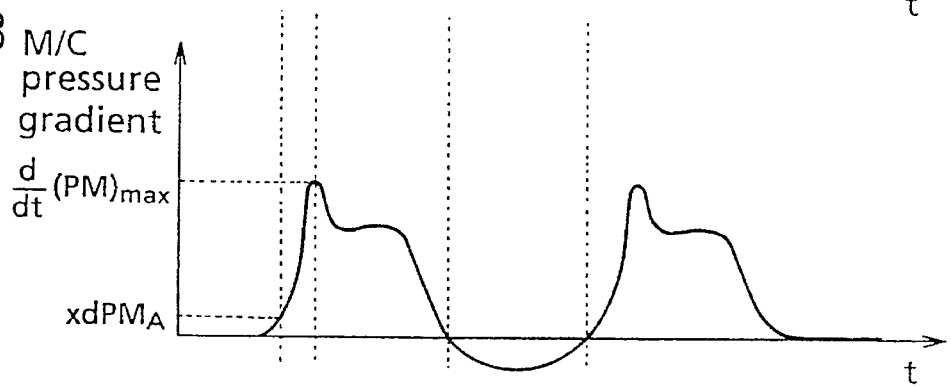
Figure 14C:
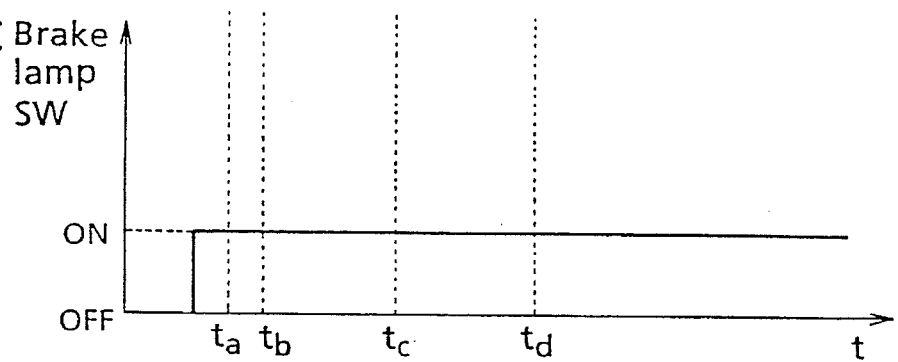

FIG. 10 is a schematic view showing the construction of the third embodiment of the braking apparatus for a vehicle. FIG. 11 is a schematic view showing operation of the embodiment of the braking apparatus for a vehicle. FIG. 1 is a schematic cross sectional view of the negative pressure brake booster applied to the present embodiment of the braking apparatus for a vehicle. FIG. 12 is a flow chart showing operation of the braking apparatus for a vehicle. FIG. 13 is a graph showing the time lapse vs. pressure gradient. Finally, FIG. 14 is a graph showing the relationship of the pressure, pressure gradient, and the brake lamp switch relative to the time lapse. Detailed parts are similar to those described in the first embodiment, and detailed description thereof is omitted.

In the braking apparatus for a vehicle of the present embodiment to which the negative pressure brake booster 1 is applied, as shown in FIG. 10, the negative pressure introduction tube 10 of the negative pressure brake booster 1 is connected with the air passage A1, and to the negative pressure source (inside the intake manifold). The air passage A2 is branched from the air passage A1, and the air passage A2 is connected to the exhaust valve 41 which is a normally-open electromagnetic valve. Further, the exhaust valve 41 is connected to the air passage A3, and its end is connected to the intake valve 42 which is a normally-closed electromagnetic valve. The air passage A4 is branched from the air passage A3, and the air passage A4 is connected to the atmosphere introduction tube 20 of the negative pressure brake booster 1.

The oil passages P1a and P1b extend from the tandem-type brake master cylinder 50 connected to the front of the negative brake booster 1, and ultimately connected to wheel cylinders (not shown) (for example, reference numerals 71–74 of FIG. 15 or FIG. 16 which will be described later). Hydraulic pressure sensors 45a and 45b as pressure detection means are connected halfway to the oil passages P1a and P1b.

The brake pedal 21 connected to the input pestle 22 of the negative pressure brake booster 1 is provided with the brake SW (brake lamp SW and the like) mounted as operation detection means to be capable of detecting the operation of the brake pedal 21 and the pressing force sensor 47 as operation force detection means. The pressing force sensor 47 uses, for example, a pressing pressure sensor such as the step-on pedal type variable resistor or the like, which is mounted at nearly the center of the surface of the brake pedal 21 at the driver side to be positively pressed.

At the input side of the electronic control unit ECU 40 mounted on the vehicle, the hydraulic pressure sensors 45a and 45b, the brake SW, and the like are connected. Further, at the output side, solenoid units of the exhaust valve 41 and the intake valve 42 of the rapid braking assist system are connected.

Next, functions of the braking apparatus for a vehicle of the present embodiment of the above construction will be described.

As shown in FIG. 12, in step S100, determination data for determining whether or not rapid braking is a condition to operate the system of the braking apparatus for a vehicle (a condition when a driver, applying only a weak pressing force, performs rapid braking) is read to the storage unit. In this case, a time lapse t after the brake SW 46 detects operation of the pedal, M/C pressure PM detected by the hydraulic pressure sensors 45a and 45b connected to the output side of the brake master cylinder 50, and the value of the M/C pressure gradient d(PM)/dt are read. These values are read at every execution period (e.g. 5 msec) of the routine.

Next, the processing proceeds to step S101, after step S101, a determination is made as to whether or not rapid braking is executed by a driver of weak pressing force. That is, first, in step S101, the processing proceeds to step S102 if the brake lamp SW is ON which is a determination material read in step S100, where a determination is made as to whether or not the master cylinder (M/C) pressure gradient d(PM)/dt is more than a first preset pressure gradient XdPMA. If Yes, the processing proceeds to step S103. In step S103, an average value PMa of M/C pressure from 0.1 sec (first predetermined time) from that point is stored, and the processing proceeds to S104. In the present embodiment, the first preset pressure gradient XdPMA is 10 MPa/sec.

In step S104, based on the graph in FIG. 13, a determination is made as to whether or not the M/C pressure PM after 0.1 sec (second predetermined time) as $t_2$ from the time (area A) at which the master cylinder (M/C) pressure gradient d(PM)/dt is more than the first preset pressure gradient XdPMA in step S102 is less than the sum of the stored value PMs stored in step S103 and a preset value PMk. In the present embodiment, the preset value PMk is 2.5 MPa. In step S104, if the read M/C pressure PM is determined to be less than the stored value PMs+preset value PMk, the processing proceeds to step S105 (satisfaction of the first condition).

In step S105, a determination is made as to whether or not the time when the M/C pressure gradient d(PM)/dt is 0 or negative is within the preset time to (50 msec in the present embodiment). That is, as shown in FIG. 14, when the driver presses the brake pedal to brake the vehicle, the brake lamp is turned from OFF to ON, the M/C pressure PM of the master cylinder gradually increases, and the M/C pressure gradient d(PM)/dt increases. At the time $t_a$, the M/C pressure gradient d(PM)/dt exceeds the first preset pressure gradient XdPMA=10 MPa/s, and at the time $t_b$, reaches the maximum value d(PM)/dtmax. When the driver further presses the brake pedal and holds it, at the time $t_c$ the M/C pressure gradient d(PM)/dt is 0 MPa/sec. After that, when the driver releases the brake pedal, the M/C pressure PM decreases, the M/C pressure gradient d(PM)/dt also decreases to a negative value. At the time $t_d$, the M/C pressure PM is 0 MPa, and the M/C pressure gradient d(PM)/dt is 0 MPa/s. At this moment, when the driver does not completely release the brake pedal and presses it again, the brake lamp remains ON, and the M/C pressure PM and the M/C pressure gradient d(PM)/dt increase.

In such an operation condition, in step S105, the time lapse ($t_c$–$t_d$) when the M/C pressure gradient d(PM)/dt is 0 or negative, if the time lapse is within a preset time t4= 50 msec, the processing proceeds to step S106, and if not, it is reset. Therefore, in the double brake operation as described above, misoperation of control is prevented by resetting the individual detection values.

In step S106, a determination is made as to whether or not the M/C pressure gradient d(PM)/dt is more than a second preset pressure gradient XdPMB and the time lapse t is more than a third predetermined time t2. In the present embodiment, the second preset pressure gradient XdPMB is 30 MPa/s and the time lapse Xt is 100 msec. In step S106, if the M/C pressure gradient d(PM)/dt is more than 30 MPa/sec and the time lapse t is more than 100 msec, the processing proceeds to step S107 (satisfaction of the second condition).

In step S107, in view of fail safe, a determination is made as to whether or not the M/C pressure PM is higher than a first reference value PMS1 (in the present embodiment PMS1 =1.6 MPa). If Yes, it is determined that rapid braking is made, the processing proceeds to step S108 where the system of the braking apparatus for a vehicle is operated.

In the flow chart of the system of the braking apparatus for a vehicle of the present embodiment, the values of the first reference value PMS 1, the first preset pressure gradient XdPMA, the second preset pressure gradient XdPMB, the preset value PMk, and the first to fourth preset times t1, t2, t3 and t4 are based on experimental data by a driver applying a weak pressing force, in which the brake hydraulic pressure does not rapidly increase even when the brake operation is started but, after the lapse of a predetermined time Xt, the brake pressure increases so rapidly that can be regarded as rapid braking. These threshold values are varied with the subject condition.

When the determination result is No in steps S101 to S107, as shown in FIG. 10, the intake valve 42 is OFF, and the rapid braking assist system is in non-operation, that is, operation condition of the ordinary negative pressure brake booster, and the atmosphere valve 13b is opened. At this moment, since the intake valve 42 is already opened, by opening the atmosphere valve 13b, atmosphere flows from the rear atmospheric chamber 15 to the front atmospheric chamber 2b and the rear atmospheric chamber 3b (indicated by the arrow), by the pressure difference between the atmospheric chambers 2b and 3b and the front negative pressure chamber 2a and the rear negative pressure chamber 3a, the front piston 4 and the rear piston 5 are pressed towards the negative pressure chambers 2a and 3a side, and the brake force is normally assisted.

When the brake pedal 21 is not operated, or immediately after operating the brake pedal 21, since the negative pressure valve 13a is opened as shown above, and the atmosphere valve 13b is closed, the atmospheric chambers 2b and 3b are maintained at the same pressure as the negative pressure chambers 2a and 3a with no pressure difference. Further, the front piston 4 and the rear piston 5 are retreated by the valve return spring 34 to the retreat limit.

On the other hand, when all determination results are Yes in the determination in steps S101 to S107, and the rapid braking assist system is in operation, as shown in FIG. 11, the intake valve 42 is urged to open, atmosphere forcibly flows through the atmosphere introduction tube 20 and the tube 18 to the front atmospheric chamber 2b, and further through the tube 19 to the atmospheric chamber 3b (indicated by the arrow). This rapidly generates a pressure difference between the front negative pressure chamber 2a and the front atmospheric chamber 2b and between the rear negative pressure chamber 3a and the rear atmospheric chamber 3b, the front piston 4 and the rear piston 5 are both urged to the negative pressure side, that is, to the front side to make braking, thereby forcibly assisting the braking force. At this moment, when the atmosphere valve 13b is open, atmosphere also flows from the atmospheric chamber 15 (indicated by the arrow), and the braking force is even further assisted.

It is possible that the exhaust valve 41 is opened at the same time the intake valve 42 is opened to escape part of atmosphere flowing in from the intake valve 42, thereby adjusting the pressure acting upon the atmospheric chambers 2b and 3b. The forcible supply of atmosphere is determined as rapid braking immediately after the brake pedal is pressed, that is, while the negative pressure valve 13a is opened. Further, since the atmospheric chambers 2b and 3b are communicated with the negative pressure side through the negative pressure valve 13a when the atmosphere valve 42 is opened, the pressure acting upon the atmospheric chambers 2b and 3b is lower than the atmospheric pressure. However, in a rapid braking condition, since the time when the negative pressure valve 13a is very short, the negative pressure valve 13a is momentarily closed, and communication of the atmospheric chambers 2b and 3b with the negative pressure side is shut off, and assistance of brake force is satisfactorily performed.

As described above, since the intake valve 42 is opened, atmosphere is forcibly supplied to the atmospheric chambers 2b and 3b, a sufficient braking force can be obtained even when a driver applying a weak pressing force performs rapid braking. In the present embodiment, the pressure acting upon the atmospheric chambers 2b and 3b is the atmospheric pressure. However, alternatively, the intake valve 42 may be connected to an air compressor or the like, so that a pressure higher than the atmospheric pressure is applied to the atmospheric chambers 2b and 3b when the intake valve 42 is opened, to enhance the assistance of brake force even further.

In the present embodiment, as the booster, the negative pressure brake booster is used which applies a negative pressure to the negative pressure chambers 2a and 2b, and the atmospheric pressure (positive pressure) to the atmospheric chambers 2b and 3b. However, alternatively, a positive pressure brake booster may be used in which the negative pressure chambers 2a and 2b of the negative pressure brake booster 1 correspond to atmospheric chambers, and the atmospheric chambers 2b and 3b correspond to positive pressure chambers, when a rapid braking condition is detected, a positive pressure higher than for normal braking is applied to assist the brake force.

Next, as a fourth embodiment, a case in which the above rapid braking assist system control is applied to another rapid braking assist system (brake hydraulic pressure system) will be described. FIG. 15 is a schematic view showing the structure of the present embodiment of the braking apparatus for a vehicle according to the present invention. Further, FIG. 16 is a schematic view showing the operation condition of the braking apparatus for a vehicle of the present embodiment.

Figure 15:
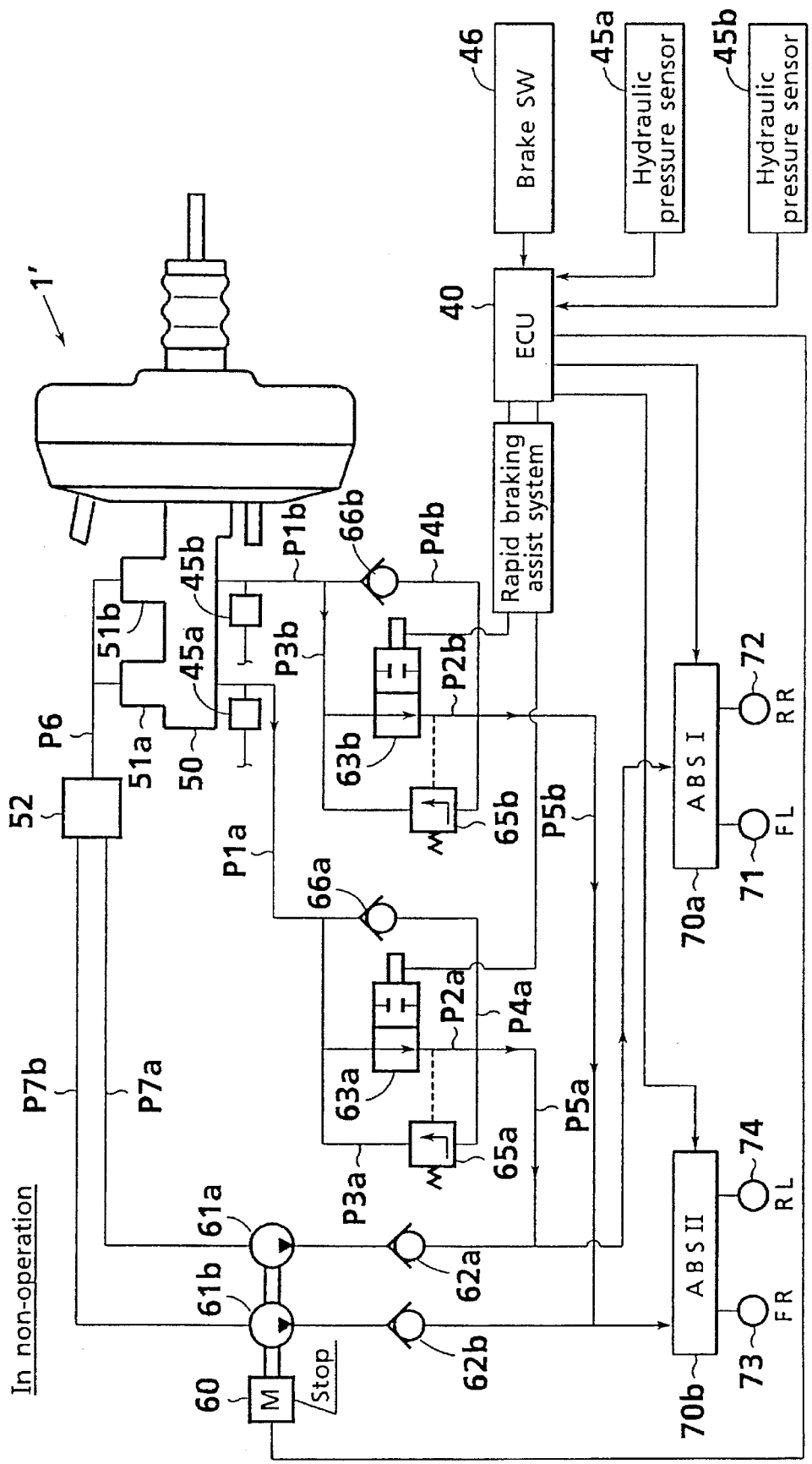
FIG. 15 is a schematic view showing the fourth embodiment of the braking apparatus for a vehicle in non-operation.

As shown in FIG. 15, the output ports disposed at two positions in the tandem-type brake master cylinder provided in the front part of the ordinary negative pressure brake booster 1 are connected individually to the oil passages P1a and P1b. Hydraulic pressure sensors 45a and 45b are disposed in the oil passages P1a and P1b.

The oil passages P1a and P1b are individually branched; the oil passage P1a divided into oil passages P2a, P3a, and P4a, and the oil passage P1b divided into oil passages P2b, P3b, and P4b. The oil passages P2a and P2b are provided with change-over valves 63a and 63b which are normally-open electromagnetic valves. Further, the oil passages P3a and P3b are provided with pressure valves 65a and 65b which release the hydraulic pressure of the oil passages P2a and P2b as a pilot pressure. Oil passages P4a and P4b are provided with check valves 66a and 66b.

The oil passages P2a, P3a, and P4a and the oil passages P2b, P3b, and P4b are joined and connected to oil passages P5a and P5b, and to the individual wheel cylinders 71–74 through ABS-I 70a and ABS-II 70b which are valve units constituting the individual ABS systems. The ABS-I 70a is connected to the wheel cylinder FL 71 and the wheel cylinder RR 72, and the ABS-II 70b is connected to the wheel cylinder FR 73 and the wheel cylinder RL 74. The ABS-I 70a and ABS-II 70b which are valve units constituting the ABS systems are known systems, and detailed description thereof is omitted.

On the other hand, oil reservoir cylinders 51a and 51b provided in the tandem-type brake master cylinder 50 are connected to a reserve tank 52 through the oil passage P6, and the reserve tank 52 is connected with oil passages P7a and P7b. The oil passages P7a and P7b are provided with pumps 61a and 61b which are operated by a driver motor 60, and check valves 62a and 62b are disposed at the downstream. The oil passages P7a and P7b join with the oil passages P5a and P5b at the downstream of the check valves 62a and 62b.

At the input side of the ECU 40, as described in the third embodiment, in addition to the hydraulic pressure sensors 45a and 45b, and the brake SW 46, sensors required for operation of the ABS-I 70a and the ABS-II 70b are connected. Further, at the output side, in addition to the solenoid units of the change-over valves 63a and 63b of the rapid braking assist system, solenoid units of individual electromagnetic valves (not shown) of the ABS-I 70a and the ABS-II 70b are connected.

Next, functions of the rapid braking assist system of the braking apparatus for a vehicle of the present embodiment of the above construction will be described. Also in the present embodiment, the rapid braking assist system control executes the routine of FIG. 12 described in the third embodiment, however, step S108 is replaced with a step in which the change-over valves 63a and 63b and the motor 60 are ON, and the change-over valves 63a and 63b and the motor 60 are OFF.

The rapid braking assist system control routine is executed, by the determinations in steps S1012 to S107, when normal braking is determined in which the brake pedal 21 is not operated and braking is not performed, or when a normal braking is determined in which the system is not operated at the time the braking is started, in step S108, the change-over valves 63a and 63b and the motor 60 are OFF, and the rapid braking assist system is not operated.

In this case, as shown in non-operation in FIG. 15, the change-over valves 63a and 63b are not supplied with drive signal of the ECU 40 and both are opened, hydraulic pressure from the output port of the brake master cylinder 50 is supplied to the individual wheel cylinders 71, 72, 73, and 74 through the ABS-I 70a and the ABS-II 70b. Further, since the motor 60 is not supplied with the drive signal, the pumps 61a and 61b are not operated.

In this case, when oil passes through the opened change-over valves 63a and 63b, and the hydraulic pressure in the oil passages P2a and P2b reaches the predetermined pilot pressure, the pressure valves 65a and 65b are opened, the oil passages P2a and P3b are used as oil passages along with the oil passages P2a and P2b to increase the flow rate, and the braking force is further increased. High-pressure oil of the oil passages P5a and P5b supplied from the brake master cylinder 50 does not flow back to the reserve tank 52 by the function of the check valves 62a and 62b.

On the other hand, when, by the determinations in steps S101 to S107 of the rapid braking assist system control routine, braking force assist is determined to be necessary, in step S108, the change-over valves 63a and 63b and the motor 60 are ON to begin operation of the rapid braking assist system.

Figure 16:
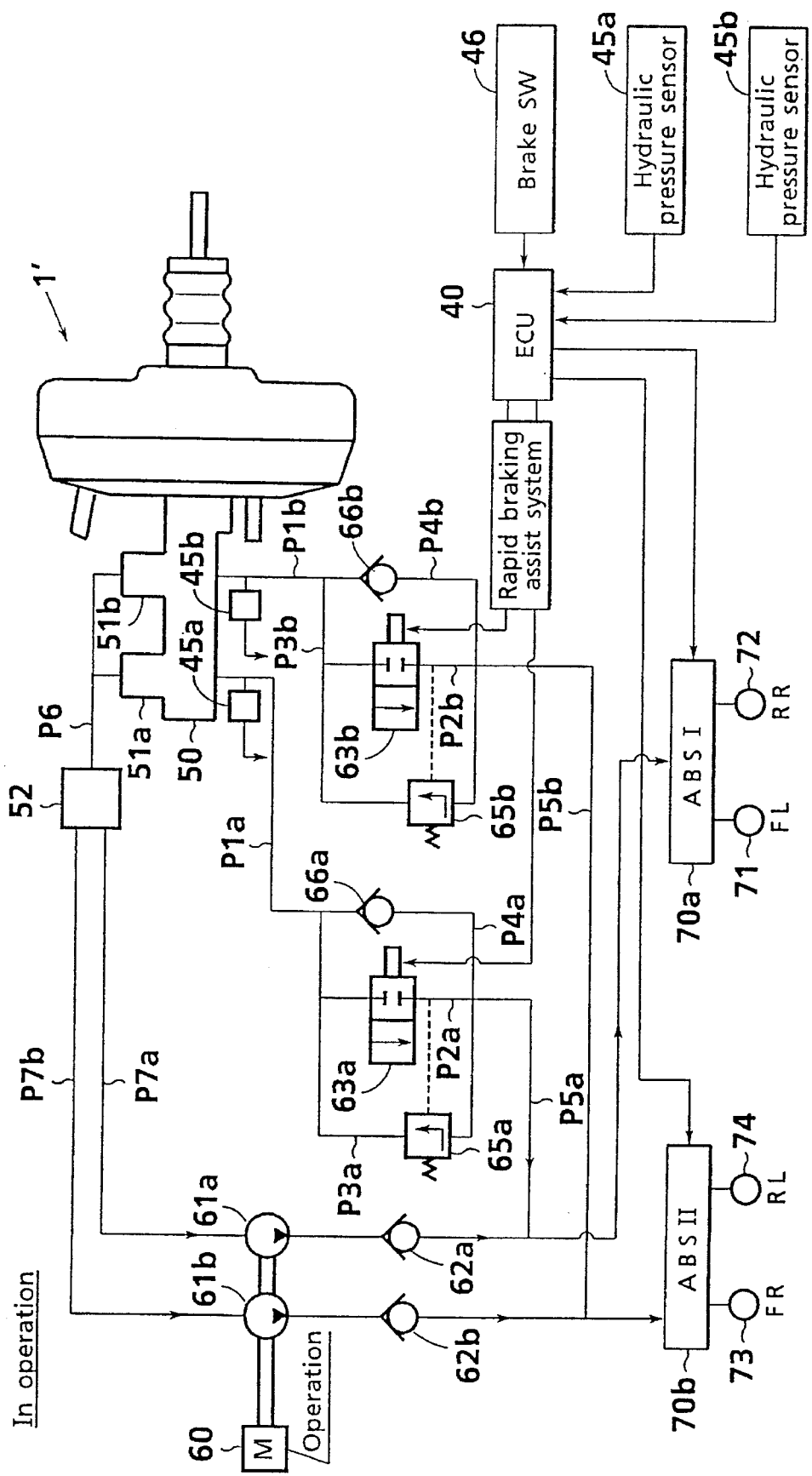
FIG. 16 is a schematic view showing the fourth embodiment of the braking apparatus for a vehicle in operation.

In this case, as shown in FIG. 16 in operation, the change-over valves 63a and 63b are supplied with the drive signal and opened, the motor 60 is operated to operate the pumps 61a and 61b, and the individual wheel cylinders 71, 72, 73, and 74 are supplied with the discharge pressure of the pumps 61a and 61b through the ABS-I 70a and the ABS-II 70b. Discharge pressure of the pumps 61a and 61b is preset to a pressure required and sufficient for executing the rapid braking, thereby obtaining a sufficient braking force even by a driver applying a weak brake pressing force.

At this moment, hydraulic pressure of the oil passages P1a and P1b is lower than that of the oil passages P5a and P5b. However, when the brake pedal 21 is pressed further strongly after the operation of the assist system, hydraulic pressure of the oil passages P1a and P1b overcomes the discharge pressure of the pumps 61a and 61b. It becomes higher than the hydraulic pressure of the oil passages P5a and P5b, and oil flows to the ABS-I 70a and ABS-II 70b through the check valves 66a and 66b.

The ABS-I 70a and the ABS-II 70b, when a predetermined condition is detected, are supplied with a predetermined drive signal from the ECU 40 to operate, which can further enhance the effect of the rapid braking assist system. However, since the functions of the ABS system are known in the art, detailed description -thereof is omitted.

Further, the sensor for detecting the rapid braking condition is not limited to the hydraulic pressure sensor, brake SW. A pressing force sensor can be used in the above embodiments, for example. Further, a scan-type laser radar mounted at the front end of the vehicle, a wheel speed sensor, a steering angle sensor mounted on the steering unit, and the like may be used. Still further, ABS systems (ABS-I 70a and ABS-II 70b) similar to those used in the fourth embodiment may be applied to the rapid braking assist system of the third embodiment, which can further improve the brake performance.

In the above-described individual embodiments, distinguishing normal braking and rapid braking is made by comparing the maximum M/C pressure gradient d(PM)/dtmax with the reference value XdPM (300 kgf/cm$^2$/sec), or comparing the M/C pressure gradient d(PM)/dt with the second preset pressure gradient XdPMB (30 MPa/sec). These specified values XdPM, and the second preset pressure gradient XdPMB are fixed values based on experimental data. However, they may be varied according to the operation condition of the vehicle.

Figure 35:
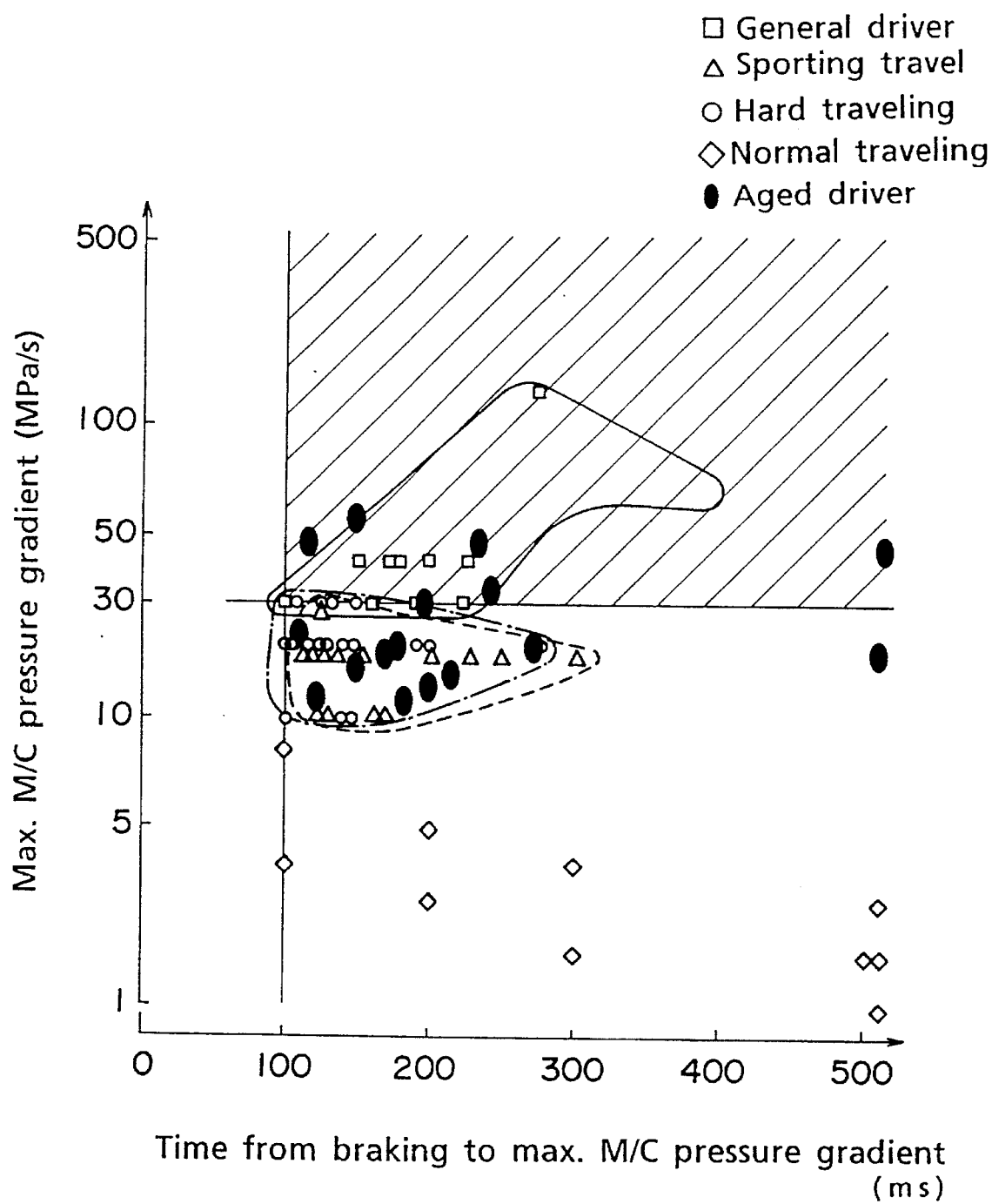
FIG. 35 is a graph showing master cylinder maximum gradient in rapid braking in individual conditions of different operation tendencies.

As shown in FIG. 35, for example, when emergency braking is determined when the time lapse from the beginning of pressing the brake to the maximum gradient of the master cylinder is more than 100 msec and the maximum M/C pressure gradient of the master cylinder is less than 30 MPa/sec, and the brake operation force is assisted a driver having a maximum gradient of within 10 to 30 MPa/sec may be omitted. Further, if the lower limit of the maximum pressure gradient is set to 10 MPa/sec, sporty driving or hard driving may be included. Those which do not require assistance of brake operation force may be included.

A fifth embodiment is to deal with such an operation condition differing depending on-the intention of the driver.

Figure 17:
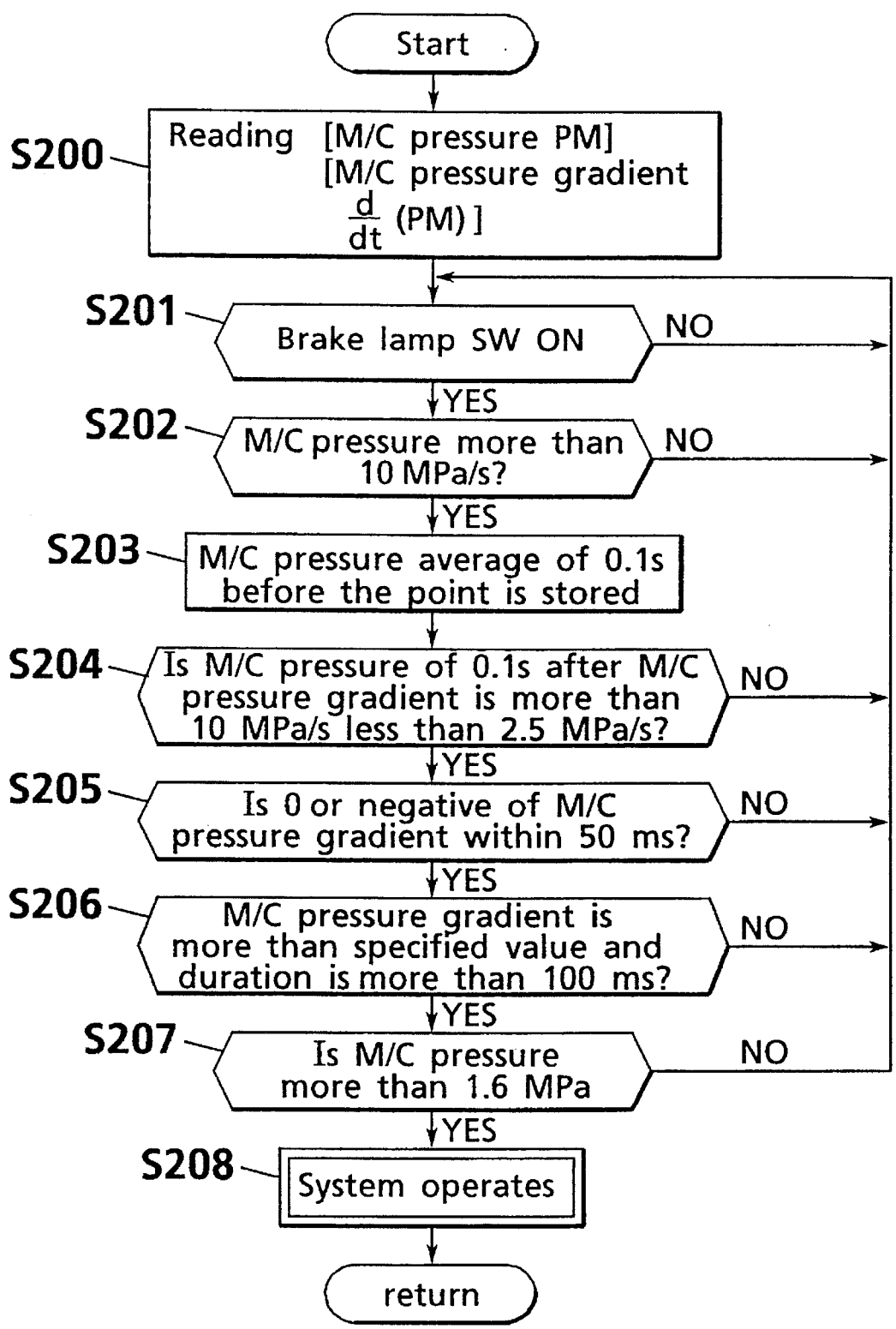
FIG. 17 is a flow chart showing the control routine of a fifth embodiment of the braking apparatus for a vehicle.
Figure 18:
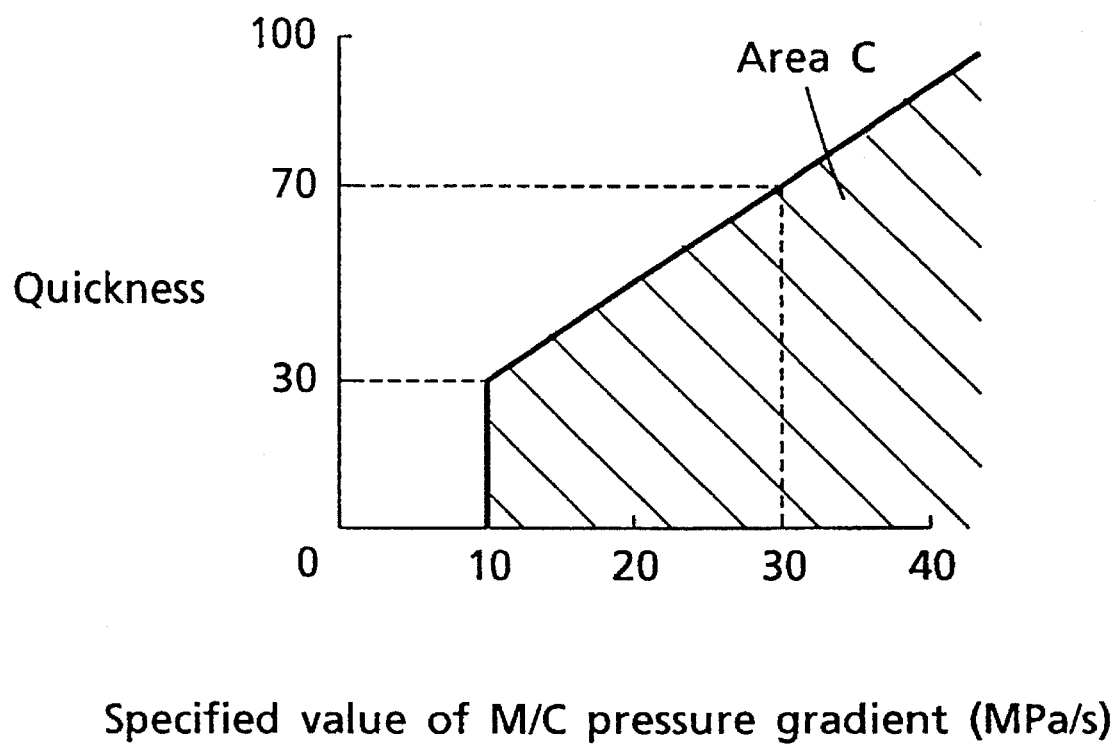
FIG. 18 is a graph showing the relationship between M/C pressure gradient and the quickness as a measure showing the operation tendency of the driver in the fifth embodiment.
Figure 19:
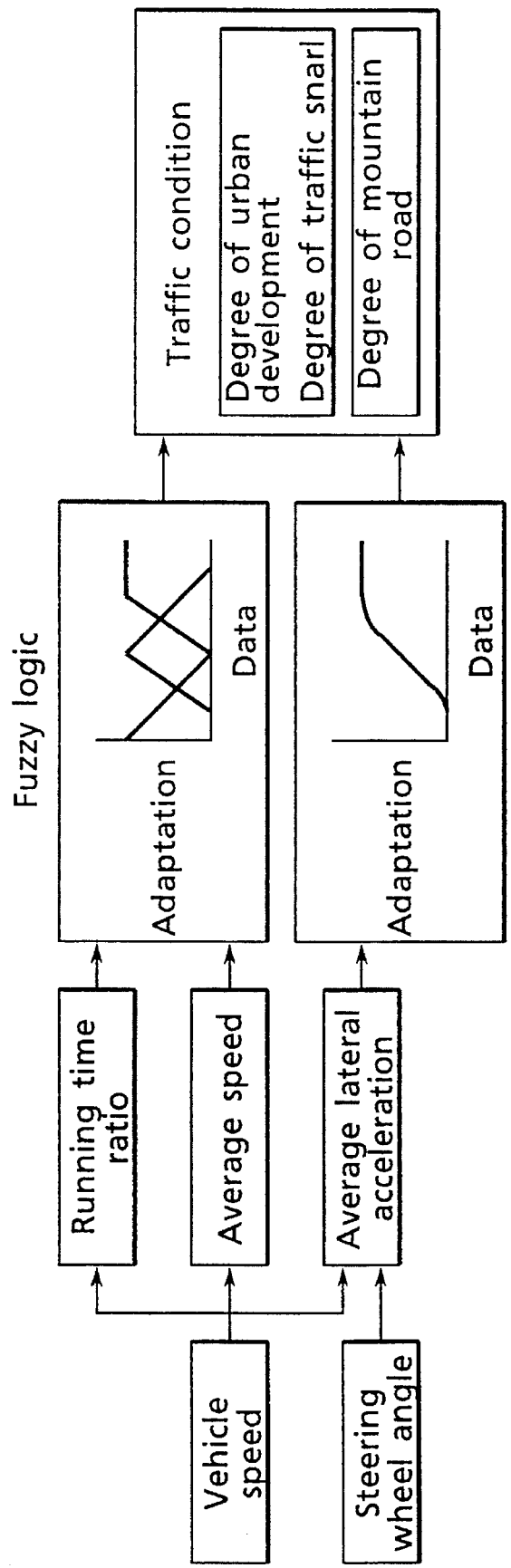
FIG. 19 is a schematic view showing the traffic condition determination procedure in the estimation method of the driver's operation tendency applied to the fifth embodiment of the braking apparatus for a vehicle.
Figure 20:
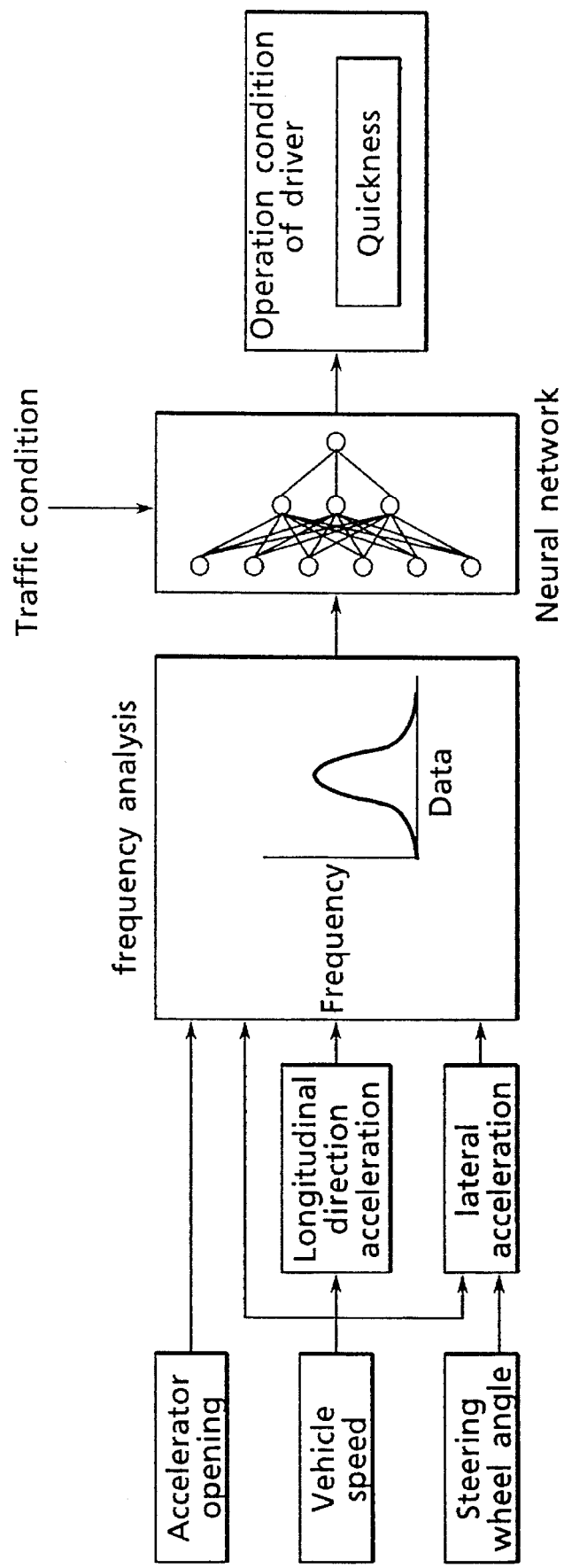
FIG. 20 is a schematic view showing the estimation method of the driver's operation tendency applied to the fifth embodiment of the braking apparatus for a vehicle.
Figure 21:
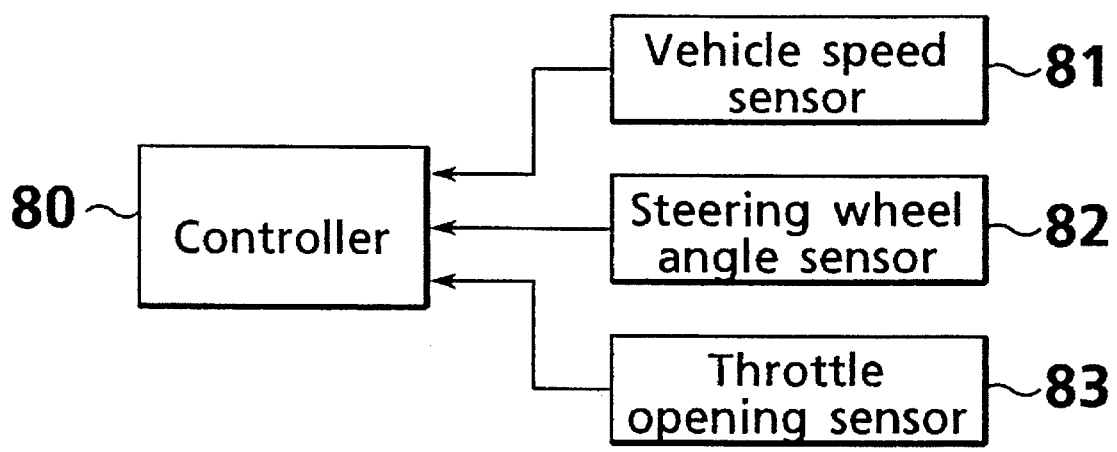
FIG. 21 is a block diagram showing the controller and the sensor for performing the estimation method of the driver's operation tendency.
Figure 22:
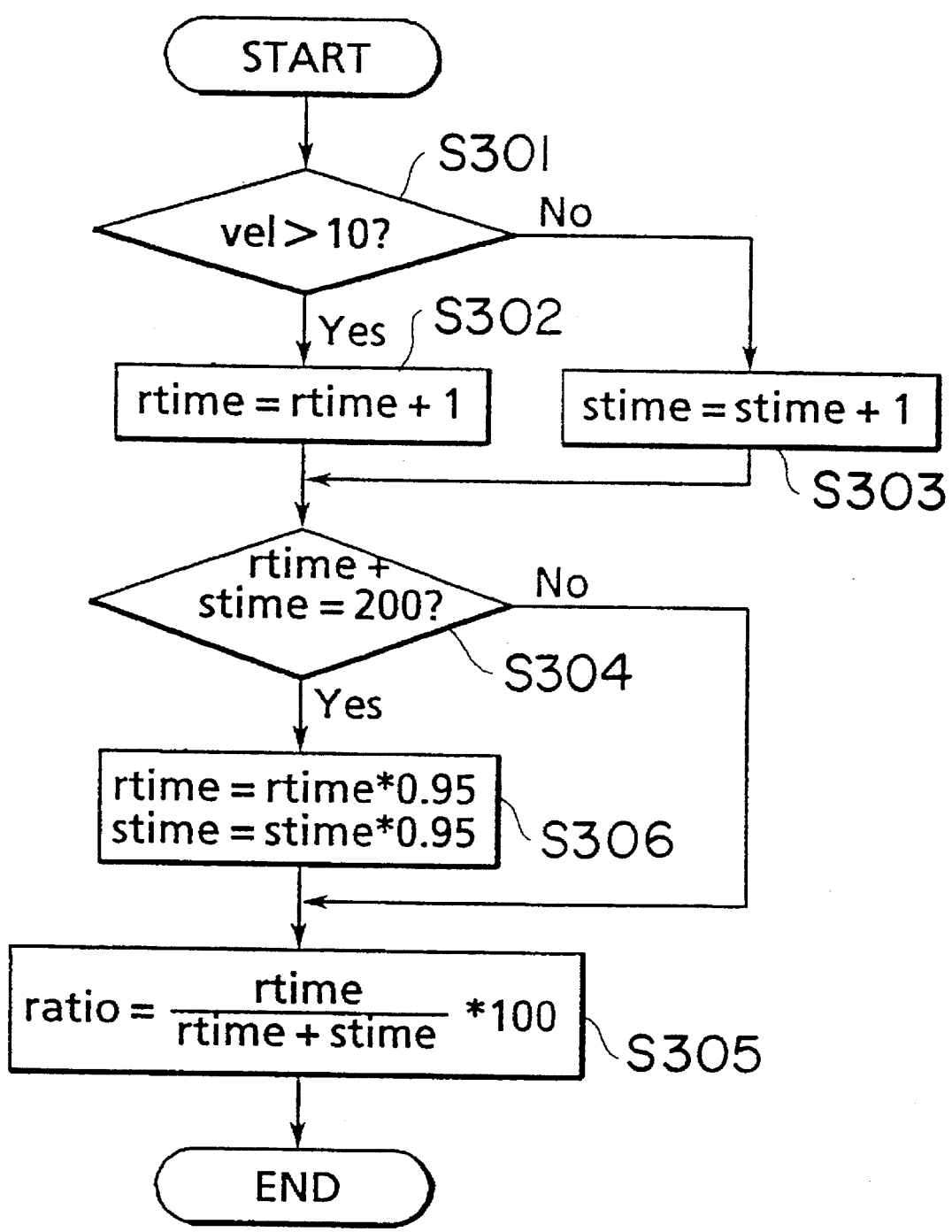
FIG. 22 is a flow chart showing the running time ratio calculation routine executed by the controller of FIG. 21.
Figure 23:
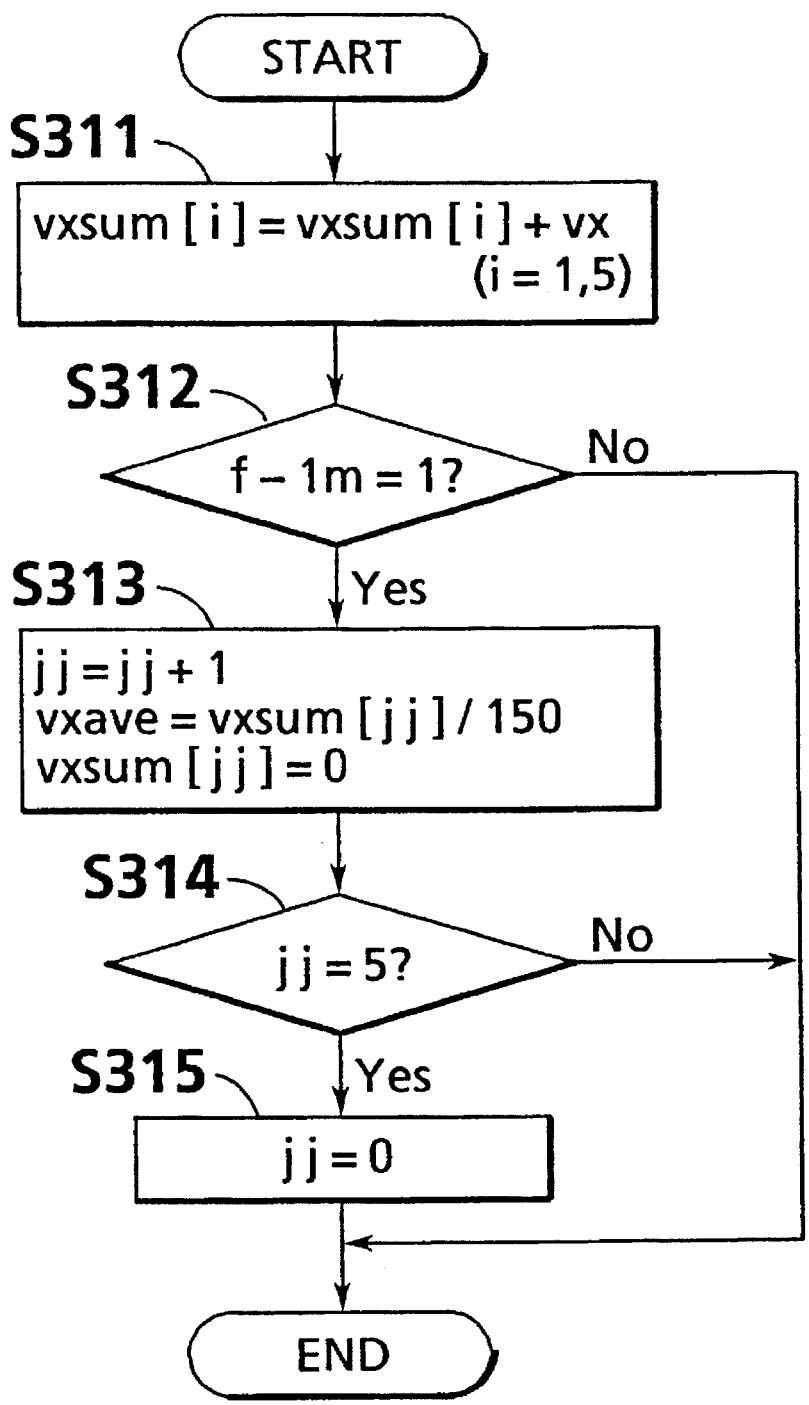
FIG. 23 is a flow chart showing the average speed calculation routine executed by the controller of FIG. 21.
Figure 24:
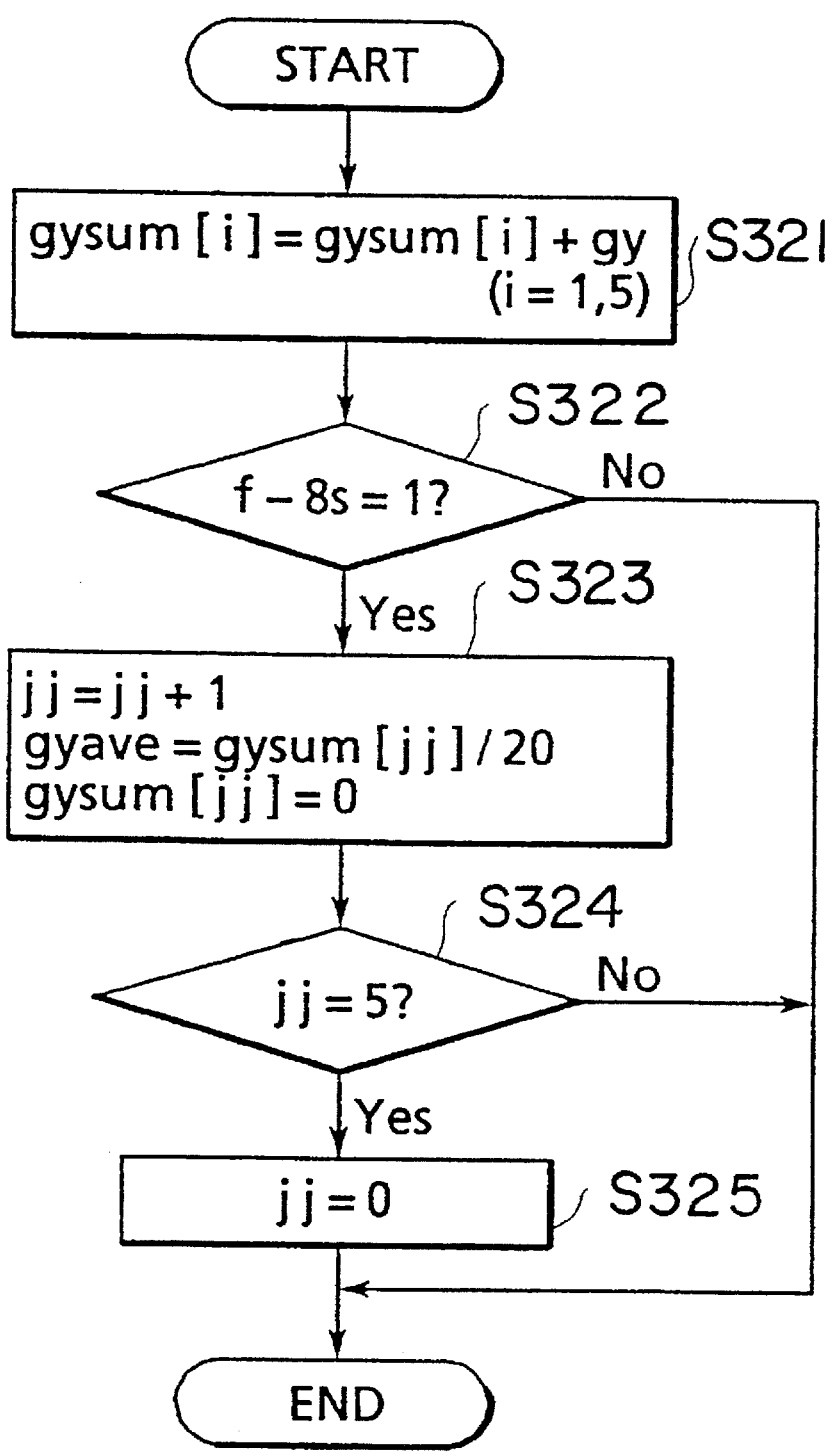
FIG. 24 is a flow chart showing the average lateral acceleration calculation routine executed by the controller of FIG. 21.
Figure 25:
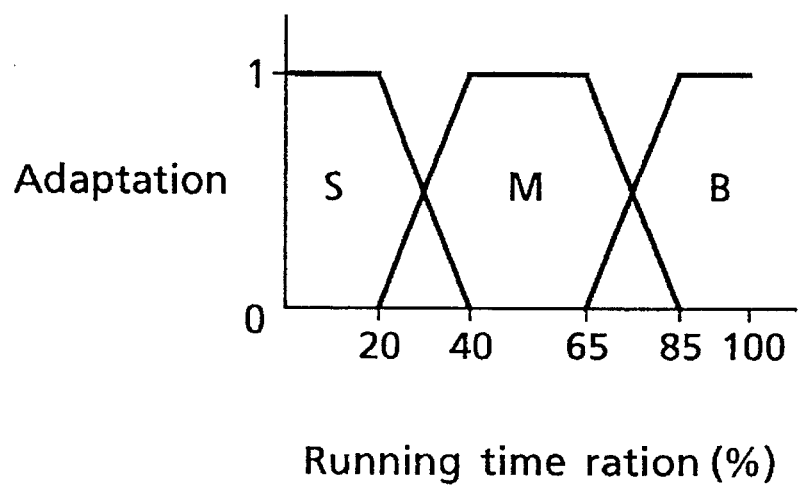
FIG. 25 is a graph showing the membership function defining the fuzzy set on the running time ratio.
Figure 26:
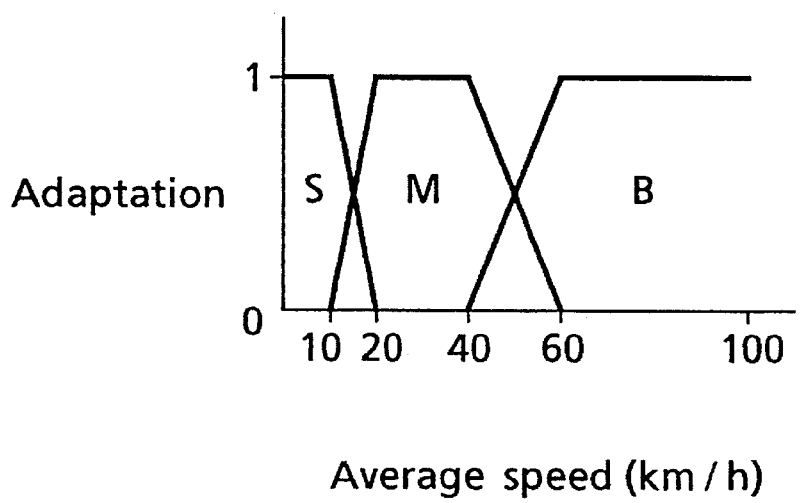
FIG. 26 is a graph showing the membership function defining the fuzzy set on the average speed.
Figure 27:
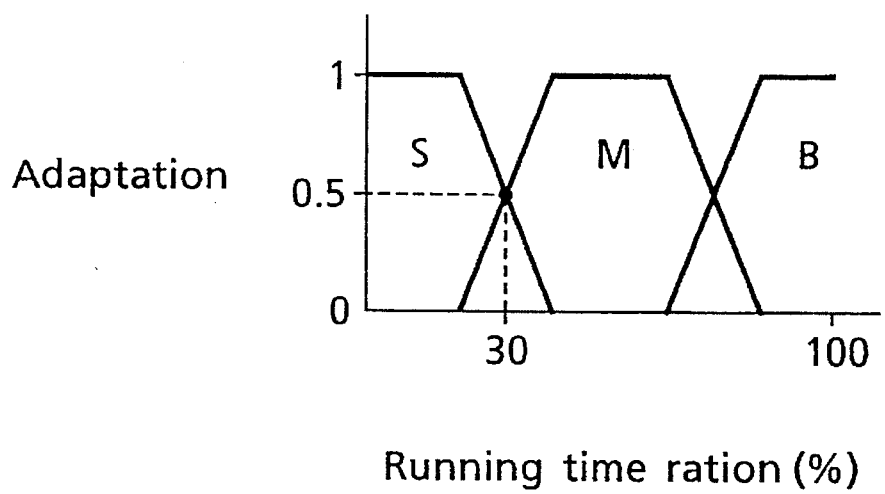
FIG. 27 is a graph showing a calculation example of the adaptation of actual running time ratio to the running time ratio fuzzy set.
Figure 28:
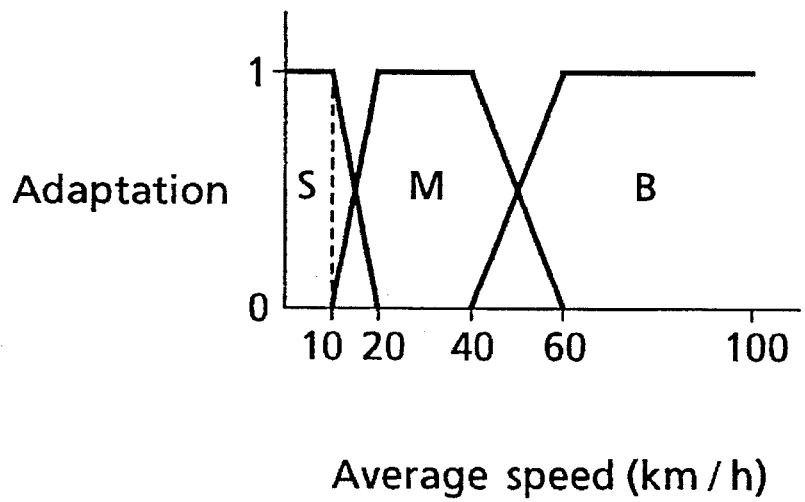
FIG. 28 is a graph showing a calculation example of the adaptation of actual average speed to the average speed fuzzy set.
Figure 29:
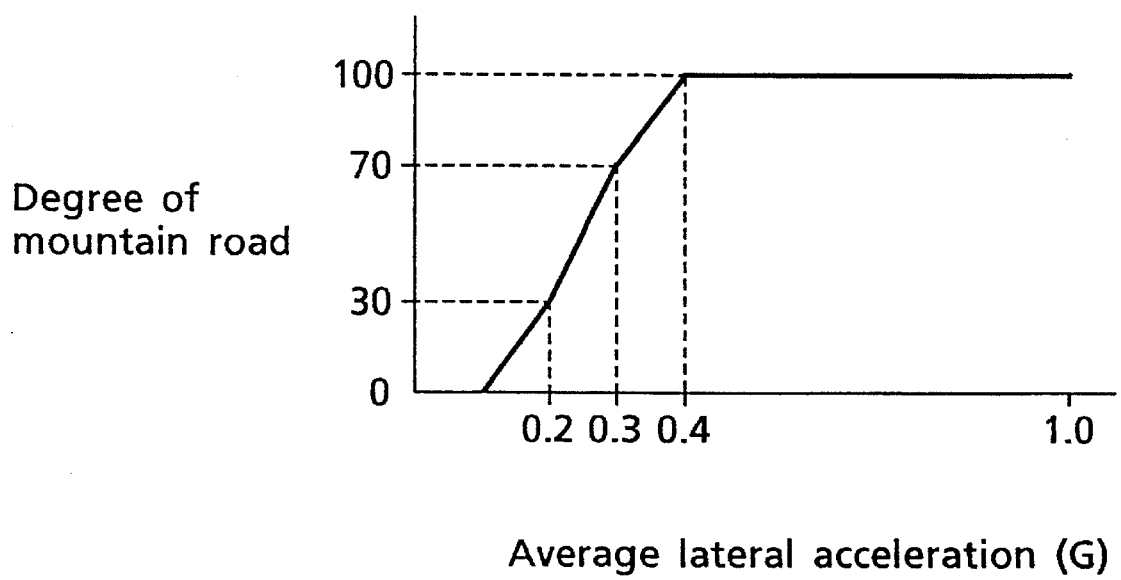
FIG. 29 is a graph exemplifying the average lateral acceleration and the mountain road degree map.
Figure 30:
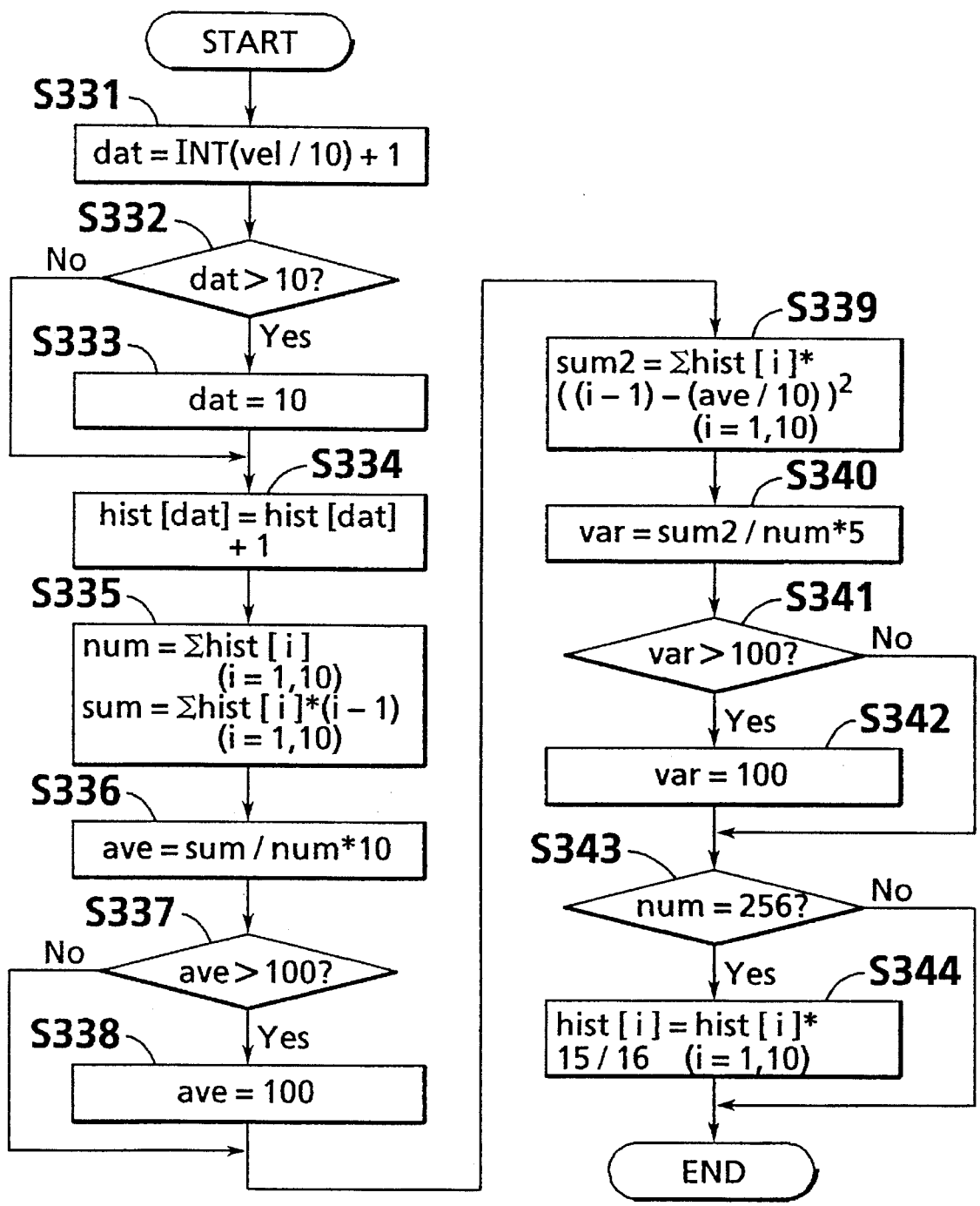
FIG. 30 is a flow chart of the frequency analysis routine executed by the controller of FIG. 21.
Figure 31:
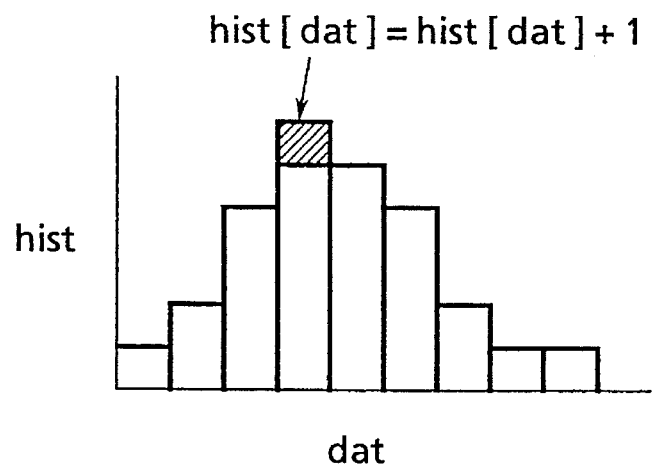
FIG. 31 is a graph showing arrangement constituting the population of input data as the subject of frequency analysis.
Figure 32:
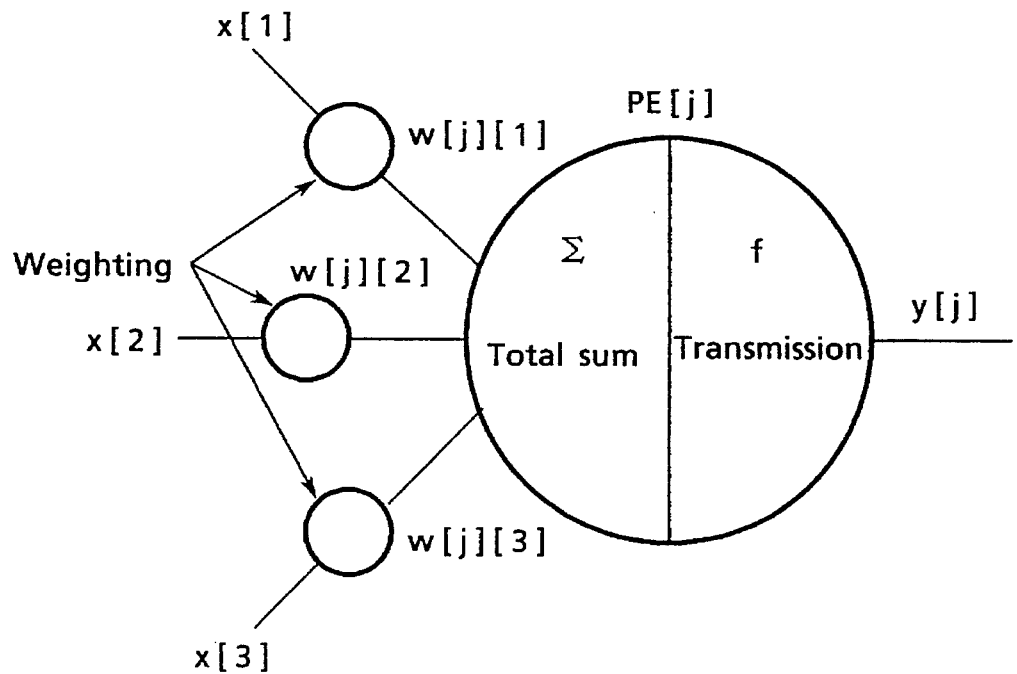
FIG. 32 is a schematic view of the processing unit constituting a neural network for estimating the driver's operation tendency.
Figure 33:
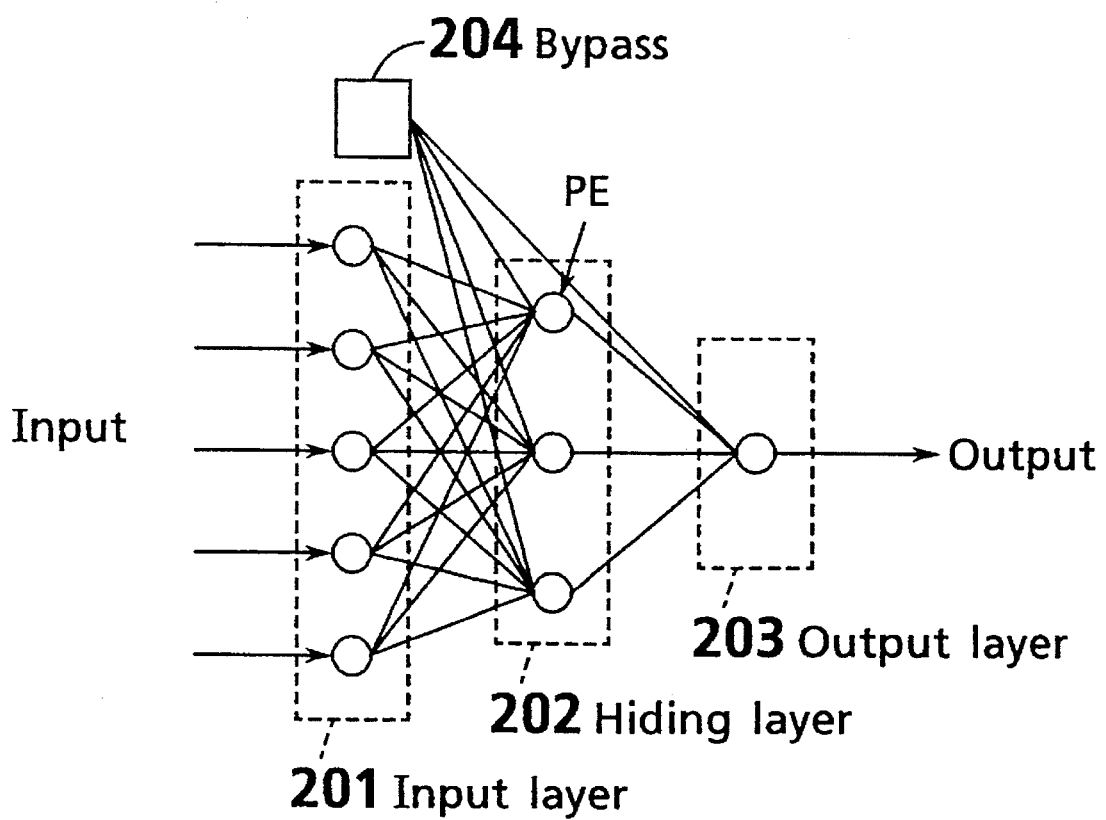
FIG. 33 is a schematic view of the neural network comprising the processing unit shown in FIG. 32.
Figure 34:
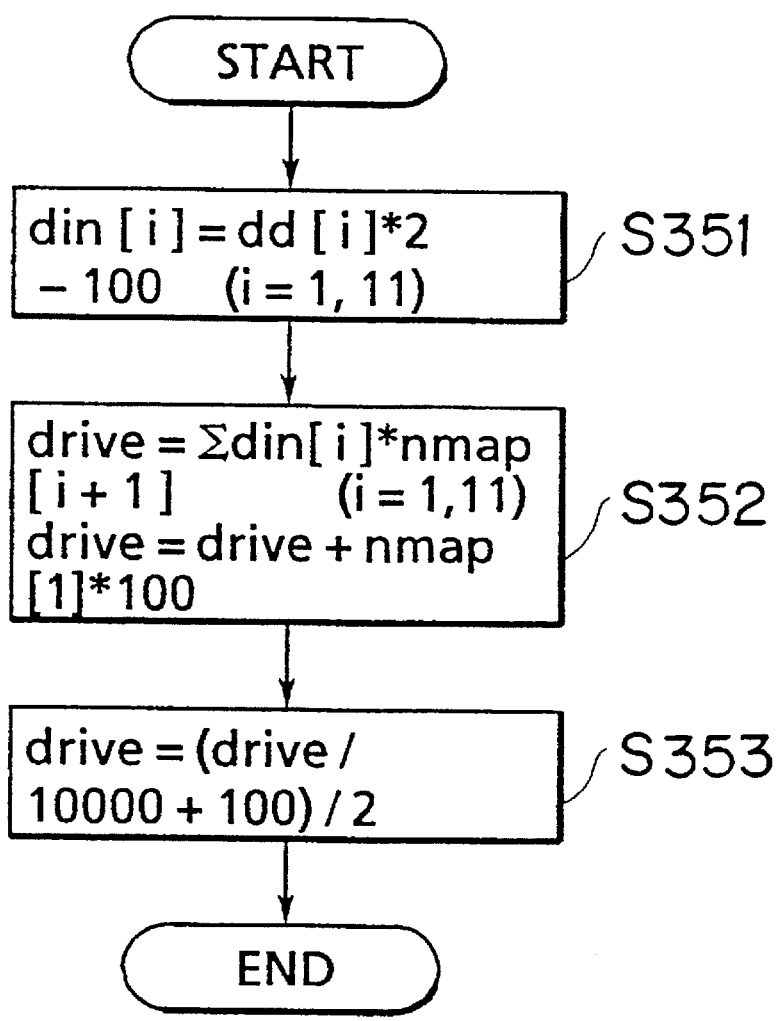
FIG. 34 is a flow chart showing a calculation routine of "quickness" as a measure indicating the driver's operation tendency executed by the controller of FIG. 21.

FIG. 17 is a flow chart showing operation of the fifth embodiment of the braking apparatus for a vehicle according to the present invention. FIG. 18 a graph showing the relationship between the second preset pressure gradient of the M/C pressure gradient and the "quickness" as a measure showing the operation tendency of the driver. FIG. 19 is a schematic view showing the road condition gripping procedure in the estimation method of the vehicle operation condition applied to the braking apparatus for a vehicle of the present embodiment. FIG. 20 is a schematic view showing the operation condition gripping procedure. FIG. 21 is a block diagram showing a controller and sensors for executing the estimation method of the vehicle operation condition. FIG. 22 is a flow chart of the running time ratio calculation routine executed by the controller. FIG. 23 is a flow chart showing the average speed calculation routine executed by the controller. FIG. 24 is a flow chart of the average lateral acceleration calculation routine executed by the controller. FIG. 25 is a graph showing the membership function defining a fuzzy set related to the running time ratio. FIG. 26 is a graph showing the membership function defining the fuzzy set related to the average speed. FIG. 27 is a graph showing a calculation example of the adaptation of the actual running time ratio to the running time ratio fuzzy set. FIG. 28 is a graph showing a calculation example of the adaptation of the actual average speed to the average speed fuzzy set. FIG. 29 is a graph showing examples of an average lateral acceleration and mountain road degree map. FIG. 30 is a flow chart of the frequency analysis routine executed by the controller. FIG. 31 is a graph showing the arrangement constituting the population of input data as the subject of frequency analysis. FIG. 32 is a schematic view showing the processing element constituting the neural network. FIG. 33 is a schematic view showing the neural network formed of the processing element. FIG. 34 is a flow chart showing the "quickness" calculation routine executed by the controller.

First, the estimation method of the vehicle operation condition applied to the braking apparatus for a vehicle of the present embodiment will be described. In the estimation method of the present embodiment, the vehicle operation condition by the driver is estimated based on the traffic condition and physical values representing the vehicle operation condition determined according to vehicle running condition parameters.

Specifically, as shown in FIG. 19, the average speed, the running time ratio (ratio of the running time to the total time including the vehicle running time and running stop time), and the average lateral acceleration as the vehicle running condition parameters are determined from the vehicle speed and the steering wheel angle. The urban development degree, traffic snarl degree, and mountain road degree as parameters representing traffic conditions are detected in accordance with a fuzzy logic based on these vehicle running condition parameters.

On the other hand, as shown in FIG. 20, physical values representing the vehicle operation condition such as accelerator opening, vehicle speed, and steering wheel angle are detected. The longitudinal direction acceleration is determined from the vehicle speed, and the lateral acceleration is determined from the vehicle speed and the steering wheel angle. Frequency distributions of the vehicle speed, accelerator opening, longitudinal direction acceleration, and lateral acceleration as vehicle operation parameters are determined by frequency analysis. Then, average values and variances of the individual frequency distributions are determined as parameters characterizing the frequency distributions.

Further, parameters representing the traffic condition (urban development degree, traffic snarl degree, and mountain road degree) and parameters characterizing the frequency distributions of the individual vehicle operation parameters are input to the neural network. In the neural network, a weighted total of these parameters is determined. This thereby determines output parameters representing the vehicle operation condition by the driver, for example, the "quickness" in the vehicle operation of the driver.

The vehicle to which the estimation method of the present embodiment is applied includes a controller 80 as shown in FIG. 21. The controller 80 includes a processor providing the fuzzy logic function and the neural network function, a memory, and an input/output circuit, and the memory stores various control programs and various data. The controller 80 is connected with a vehicle speed sensor 81, a steering wheel angle sensor 82, and a throttle opening sensor 83. The processor of the controller 80 is input with vehicle speed signal, steering wheel angle signal, and throttle opening signal from the sensors 81, 82, and 83 to successively executed individual routines which will be described later, thereby estimating the driver's "quickness".

Running time ratio calculation routine

For example, while the vehicle is in a drive condition (including running condition and running stop condition) after the engine starts operation, the processor of the controller 80 repeatedly executes the running time ratio calculation routine shown in FIG. 22, for example, in a 2-sec period.

In the individual calculation routine execution cycles, the processor inputs a vehicle speed signal Vel from the vehicle speed sensor 81 representing the actual vehicle speed, and determines whether or not Vel is more than a predetermined vehicle speed (e.g. 10 km/h). If the determination result is Yes, "1" is added to the count value rtime of an incorporated running time counter (not shown)(step S301). If the determination result in step S301 is No, "1" is added to the count value stime of a running stop time counter (not shown)(step S303).

In step S304 following step S302 or S303, a determination is made as to whether or not the sum of the running time counter value rtime and the running stop time counter value stime is equal to 200. If the determination result is No, the value of the running time counter value rtime is divided by the sum of rtime and the running stop time counter value stime is multiplied by 100 to calculate a running time ratio ratio (%) (step S305).

On the other hand, if the determination result in step S304 is Yes, a value equal to the product of running time counter value rtime and a value "0.95" is re-set to the running time counter, and a value equal to the product of running stop time counter value stime and a value "0.95" is re-set to the running stop time counter (step S306). Next, the running time ratio ratio is calculated in step S305.

That is, at the time the vehicle is driven over 400 seconds corresponding to the value "200" after the engine starts operation, both counter values are re-set. Further, after that, the counter values are re-set at every 10 seconds. With this arrangement, even when using counters of relatively small capacity, the running time ratio reflecting the vehicle driving condition before the preset time can be calculated.

Average speed calculation routine

The average speed calculation routine shown in FIG. 23 is repeatedly executed, for example, in a 2-sec period by the processor of the controller 80. In the individual routine execution cycles, the processor reads a vehicle speed data vx from the vehicle speed sensor 81, and adds the vehicle speed vx to a stored value vxsum [i] (i=1–5) of five integrated speed registers incorporated in the controller 80 (step S311). The processor determines whether or not the value of a flag f1m is "1" representing an average speed calculation timing (step S312). The flag f1m is set so that it has a value "1" in a 1-min period. If the determination result in step S312 is No, the processing of the current cycle is ended.

If the determination result in step S312 is Yes after 1 minute from the beginning of the routine, a value "1" is added to an index jj to update the index jj, the integrated register value vxsum [jj] is divided by "150" to calculate an average speed vxave, and the register value vxsum [jj] is reset to 0 (step S313). A determination is made as to whether or not the updated index jj is "5" (step S314), if the determination result is No, the processing in the current cycle is ended.

After that, the index jj is updated at every 1 minute, and the average speed vxave is determined from the integrated speed register value vxsum [jj] corresponding to the updated index jj. And, every time the lapse of 5 minutes, the index jj is reset to 0 (step S315). As described above, actual vehicle speed vx is added to the five integrated speed register values vxsum [jj] at every 2 seconds, and the average speed vxave is calculated at every 1 minute according to the stored values vxsum representing the total vehicle speed detected over 150 times (5 minutes) of one corresponding to those of the five integrated speed registers.

Average lateral acceleration calculation routine

The processor of the controller 80 repeatedly executes the average lateral acceleration calculation routine shown in FIG. 24, for example, in a 2-sec period. In the individual routine execution cycles, the processor of the controller 80 reads the output signal from the vehicle speed sensor 81 representing the vehicle speed vx and the output signal from the steering wheel angle sensor 82 representing the steering wheel angle steera and, with reference to a map (not shown), determines a predetermined steering wheel angle gygain represented as a function of the vehicle speed vx for giving a lateral acceleration of 1 (G) according to the vehicle speed vx. The processor then divides the steering wheel angle steera by the predetermined steering angle gygain to calculated a lateral acceleration gy, and adds the lateral acceleration gy to the individual stored values gysum [i] (i=1–5) of five integrated lateral acceleration registers incorporated in the controller 80 (step S321). The processor then determines whether or not the value of flag f8s is "1" representing the average lateral acceleration calculation timing (step S322). The flag f8s is set to have a value "1" in an 8-sec period. If the determination result in step S322 is No, the processing in the current cycle is ended.

If the determination result in step S322 is Yes after an 8-sec lapse from the beginning of the routine, a value "1" is added to the index jj to update the index jj, an integrated lateral acceleration register value gysum [jj] corresponding to the updated index jj is divided by "20" to calculate an average lateral acceleration gyave, and the register value gysum [jj] is reset to 0 (step S323). A determination is made as to whether or not the updated index jj is "5" (step S324). If the determination result is No, the processing in the current cycle is ended.

After that, the index jj is updated at every lapse of 8 seconds, and the average lateral acceleration is determined from the integrated lateral acceleration register value gysum [jj] corresponding to the updated index jj. The index jj is reset to "0" at every 40 seconds (step S325). As described above, the calculated lateral acceleration gy is added at every 2 seconds to the individual of five integrated lateral acceleration register values gysum [jj], and the average lateral acceleration gyave is calculated at every 8 seconds according to the stored value gysum [jj] representing the total lateral acceleration calculated over 20 times (40 seconds) of one corresponding to that of five integrated lateral acceleration registers.

Urban development degree, traffic snarl degree, and mountain road degree calculation routine In the present embodiment, an urban development degree, a traffic snarl degree, and a mountain road degree are determined using an urban road running mode, a snarl road running mode, and a mountain road running mode as vehicle running modes related to estimation of the vehicle operation condition by the driver.

The urban development degree and the traffic snarl degree are determined in accordance with a fuzzy logic rule. In relation to the fuzzy logic rule, a membership function (FIG. 25 and FIG. 26) representing a fuzzy subset in a total space (support set) on the running time ratio and the average speed, and nine fuzzy logic rules shown in the Table below are previously set and stored in a memory of a controller 15.

TABLE 1

| No. | Running time ratio | Average speed | Urban development degree (rcity) | Traffic snarl degree (rjam) |
|-----|--------------------|---------------|----------------------------------|------------------------------|
| 1 | S | S | 100 | 100 |
| 2 | S | M | 50 | 100 |
| 3 | S | B | 0 | 100 |
| 4 | M | S | 50 | 100 |
| 5 | M | M | 100 | 25 |
| 6 | M | B | 50 | 0 |
| 7 | B | S | 0 | 100 |
| 8 | B | M | 20 | 0 |
| 9 | B | B | 0 | 0 |

The fuzzy logic rule setting shown in the above Table is based on the fact that the average speed is low and the running ratio is medium in urban road running, and the average speed is low and the running time ratio is low in urban road running.

In FIG. 25, symbols S, M, and B are individual labels showing fuzzy sets in the support set for the running time ratio. The membership function defining the fuzzy set S is set so that the adaptation is "1" when the running time ratio is 0 to 20%, and decreases from "1" to "0" as the running time increases from 20% to 40%. Further, the membership function defining the fuzzy set M is set so that the adaptation increases from "0" to "1" as the running time ratio increases from 20% to 40%. The adaptation is "1"] when the running time ratio is between 40% and 65%, and decreases from "1" to "0" as the running time ratio increases from 65% to 85%. The membership function defining the fuzzy set B is set so that the adaptation increases from "0" to "1" as the running time ratio increases from 65% to 85%, and the adaptation is "1" when the running time ratio is more than 85%.

Referring to FIG. 26, the membership function defining the fuzzy set S in the support set on the average speed is set so that the adaptation is "1" when the average speed is between 0 km/h and 10 km/h, and the adaptation decreases from "1" to "0" as the average speed increases from 10 km/h to 20 km/h. Further, the membership function defining the fuzzy set M is set so that the adaptation increases from "0" to "1" as the average speed increases from 10 km/h to 20 km/h, the adaptation is "1" when the average speed is between 20 km/h and 40 km/h, and the adaptation decreases from "1" to "0" as the average speed increases from 40 km/h to 60 km/h. The membership function defining the fuzzy set B is set so that the adaptation increases from "0" to "1" as the average speed increases from 40 km/h to 60 km/h, and the adaptation is "1" when the average speed is higher than 60 km/h.

The processor of the controller 80 determines an adaptation adap [i] to the individual first to ninth rules in combination of the running time ratio (%) and the average speed (km/h) individually determined by the calculation routines shown in FIG. 22 and FIG. 23, and calculates the urban development degree and the traffic snarl degree according to the following formulae.

Urban development degree [city]=Σ(adap [$i$]×rcity[$i$])+adap[$i$]($i$=1–9)

Traffic snarl degree [jam]=Σ(adap[$i$]×rjam[$i$]+adap[$i$]($i$=1–9)

Specifically, the processor determines the adaptation of the actual running time ratio to one corresponding to the i'th rule among the fuzzy sets S, M and B related to running time ratio, then determines the adaptation of the actual average speed to one corresponding to the i'th rule among the fuzzy sets S, M and B related to average speed. The smaller of both adaptations is determined as the adapt [1] of the combination of the actual running time ratio and the actual average speed to the i'th rule.

As to the first rule, as shown in FIG. 27 and FIG. 28, when the actual running time ratio is 30% and the actual average speed is 10 km/h, "0.5" is determined as the adaptation of the actual running time ratio of 30% to the running time ratio fuzzy set S, and "1" is determined as the adaptation of the actual average speed of 10 km/h to the average speed fuzzy set S. Therefore, the adaptation adapt [1] to the first rule of the combination of the actual running time ratio 30% and the actual average speed 10 km/h is "0.5".

Next, the processor of the controller 80 refers to an average lateral acceleration and mountain road degree map stored in the memory of the controller 80, and calculates the mountain road degree according to the average lateral acceleration determined in the routine of FIG. 24. This map is set so that mountain road degree is "0" when the average lateral acceleration is between 0G and about 0.1G; the mountain road degree increases from "0" to "1" as the average lateral acceleration increases from about 0.1G to 0.4G; and the mountain road degree is "100" when the average lateral acceleration is more than 0.4G. This map setting is based on the fact that the integrated value of lateral acceleration is high in mountain road running.

Frequency analysis routine

The processor of the controller 80 executes frequency analysis of the individual of the vehicle speed, longitudinal direction acceleration, lateral acceleration, and accelerator opening, for example, in a 200 msec period, to determine an average value and variance of each physical amount. FIG. 30 shows the frequency analysis routine for the vehicle speed, and frequency analysis routines (not shown) other than for vehicle speed have similar structures.

Vehicle speed as a frequency analysis subject parameter is represented by an output signal from the vehicle speed sensor 26, and the input range is set, for example, to 0–100 km/h.

Accelerator opening tps (%) is calculated according to an output signal of the throttle opening sensor 104, and the input range is 0–100%.

$tps=(tdata-tpsoff)+(tpson-tpsoff)\times 100$ where symbol tdata denotes the current throttle opening sensor output, symbols tpsoff and tpson are individually throttle opening sensor outputs in an accelerator OFF condition and an accelerator full open condition.

Further, the processor of the controller 80 samples the vehicle speed sensor output, for example, in a 100 msec period, and calculates the longitudinal direction acceleration gx (G) according to the following equation. The input range of the longitudinal direction acceleration is, for example, 0–0.3G.

$$gx=(vx-vxo)\times10+(3.6\times9.8)$$

where symbol vx denotes the current vehicle speed (km/h), and vxo denotes the vehicle speed (km/h) before 100 msec.

Further, the output signal from the vehicle speed sensor 81 representing the vehicle speed vx and the output signal from the steering wheel angle sensor representing the steering wheel angle steera are read, referring to a map (not shown), a predetermined steering wheel angle gygain to give a lateral acceleration of 1'G) represented as a function of the vehicle speed vx is determined according to the vehicle speed vx. Then, as shown in the following equation, the processor divides the steering wheel angle steera by a predetermined steering wheel angle gygain to calculated the lateral acceleration gy(G). The input range of the lateral acceleration is, for example, 0–0.5G.

$$gy=steera/gygain$$

Referring to FIG. 30, the processor of the controller 80 adds "1" to (INT(Vel/10)), which is the vehicle speed signal Vel as a frequency analysis subject parameter (input data) equally divided by 10 within the input range 0–100 km/h, to determine a value dat (step S331), and a determination is made as to whether or not the value dat is greater than "10" (step S332). If the determination result is Yes, the value dat is re-set to "10" in step S333, and the processing proceeds to step S334. On the other hand, if the determination result in step S332 is No, the processing immediately proceeds from step S332 to step S334. In step S334, as shown in FIG. 31, "1" is added to a factor number hist [dat] corresponding to one of 100 arrays (in FIG. 21, factor number of the maximum factor array is 0) constituting the population of input data.

In step S335, a total sum "num" of the first to 10th arrays is determined. Further, a total sum "sum" of products of the factor numbers determined for the individual arrays (first array) and a value "i–1" is determined. The processor divides the total sum "sum" of products divided by the total sum "num" of individual factors further by "10" to determine an average value ave of input data (in this case, vehicle speed) (step S336).

Next, the processor determines whether or not the average value ave is greater than "100" (step S337). If the determination result is Yes, the average value ave is re-set to "100" in step S338, and the processing proceeds to step S339. On the other hand, if the determination result in step S337 is No, the processing immediately proceeds from step S337 to step S339. That is, the average value ave of input data is limited to a value of up to 100.

In step S339, the product of the square of the value (i–1)–(ave/10)), obtained by dividing the average value ave by "10" and subtracting from a value "i–1", and the factor number hist [i] of the array is determined for individual arrays, and then a total sum "sum2" of the products is determined. Then, the processor divides the total sum "sum2" by the total sum "num" of factor number and further by "5" to calculate the variance vat of input data (step S340). A determination is made as to whether or not the variance vat of input data is greater than "100" (step S341). If the determination result is Yes, after the variance var is re-set to "100" in step S342, the processing proceeds to step S343. If the determination result in step S341 is No, the processing immediately proceeds from step S341 to step S343. That is, the variance var of input data is limited up to a value "100".

In step S343, a determination is made as to whether or not the total sum "num" of factor numbers is greater than "288". If the determination result is No, the processing of the current cycle is ended. If the determination result is Yes, the individual factor number hist [i] of the first to 10th arrays is re-set to a value of the factor number hist [i] multiplied by a value "15/16" (step S344), and the processing of the current cycle is ended. That is, if the number "num" exceeds "256", the factor number of individual array is decreased to 15/16 times. After that, the processing in FIG. 30 is repeated to determine the average value and variance of the vehicle speed vel as input data periodically.

Average values and variances of accelerator opening, longitudinal direction acceleration, and lateral acceleration as other input data are similarly determined. The average value and variance of the individual input data increase as the driver's operation mode becomes "quicker". However, the average value of vehicle speed is largely affected by the traffic condition.

Operation condition calculation routine

The processor of the controller 80, by the neural network function, determines the operation condition by the driver. In the present embodiment, in addition to the individual average values and variances of vehicle speed, accelerator opening, longitudinal direction acceleration, and lateral acceleration determined by the above frequency analysis, the urban development degree, traffic snarl degree, and mountain road degree determined in accordance with the above fuzzy logic rule are input to the neural network to determine the "quickness" as an operation condition by the driver.

Conceptually, in the neural network, the processing elements (PE) shown in FIG. 32 are complexly interwined as shown in FIG. 34, and the individual PEs are input with total sums of a number of inputs x[i] multiplied by individual weights. In each PE, the total sum is converted by a transfer function, and outputs y[i] are output from the individual PEs.

Referring to FIG. 32 and FIG. 33, in the neural network used in the present embodiment, a hiding layer 202 is disposed between the input layer 201 and the output layer 203. The input layer 201 comprises 11 PEs, the hiding layer 202 comprises 6 PEs, and the output layer 203 comprises a single PE. The transfer function of the PE is specified by f(x)=x. Further, the weight w[i] at the connection of the individual PE is determined through learning. In the neural network of the present embodiment additionally has an input 204 called a bias.

In the present embodiment, the function of the above neural network is achieved by the controller 80. To utilize the function of the neural network, the processor of the controller 80 periodically executes the "quickness" calculation routine shown in FIG. 34 using the average values and variances of the vehicle speed, accelerator opening, longitudinal direction acceleration, and lateral acceleration, as well as the urban development degree, traffic snarl degree, and mountain road degree (all have output ranges of "0" to "100") as input data.

In the routine of FIG. 34, the processor of the controller 80 subtracts "100" from the product of input data dd[i] and "2" to convert the ranges of the 11 input data dd[i] (i=1–11) to "0–100" to "–100-100", thereby obtaining input data din[i] after range conversion (step S351). Then, the processor determines a total sum driver of the product of input data din [i] determined for input data din [i] after the range conversion and the weighting factor nmap [i+1], and determines similar product (nmap[i]×100) for the bias, and the product (nmap[i]×100) related to the bias is added to the total sum drive related to the input data to determine an output drive representing the "quickness" (step S352).

The "quickness" output drive is divided by "10000", and "100" is added, and the addition result is divided by "2" to convert the range of the "quickness" output from "-1000000-1000000" to "0-100" (step S353). Thus, the "quickness" calculation cycle in a calculation cycle is ended.

As described above, the output drive representing the "quickness" as the vehicle operation condition by the driver can be determined. According to the test running result, the estimated value of "quickness" of the driver represented by the output drive was in good agreement with the "quickness" evaluated by the driver himself. This is considered as due to the fact that the driver's operation condition, which is difficult to evaluate with physical amounts such as vehicle speed, is evaluated according to the average values and variances of physical amounts characterizing the frequency distribution of the individual physical amounts, and in consideration of the traffic condition.

The rapid braking assist system of the braking apparatus for a vehicle of the present embodiment to which the above-described vehicle operation characteristics control method is applied will be described.

The present embodiment is intended to control the vehicle operation characteristics to adapt to the vehicle operation condition "quickness" estimated by the above estimation method, in which the procedure to estimate the quickness is similar to that described above, and detailed description thereof is omitted. Further, in the present embodiment, as shown in FIG. 17, in the flow chart, the control of step S206 differs from step S106 (FIG. 12) of the above-described third embodiment, but other steps S100–S105, S107, and S108 are the same, description thereof is omitted.

In the braking apparatus for a vehicle of the present embodiment, to distinguish normal braking and emergency braking from each other, the second preset pressure gradient XdPMB of the M/C pressure gradient d(PM)/dt of the master cylinder used is set according to the "quickness" determined by the vehicle operation condition estimation method described above. As can be seen from the graph shown in FIG. 18, when the M/C pressure gradient d(PM)/dt relative to the estimated "quickness" is in the area C, an emergency braking condition is determined.

That is, as shown in the flow chart in FIG. 17, in step S206, when the M/C pressure gradient is more than the estimated value and the time lapse is more than 100 msec, the processing proceeds to step S207 to operate the system. In this case, when the vehicle is in sporty driving or hard driving, the driver's "quickness" is high, for example, when the "quickness" is "70", the specified value is 30 MPa/sec. On the other hand, in traveling by a driver capable of applying only a weak operation force to the operation member the driver's "quickness" is low, for example, when the "quickness" is "30", the specified value is 10 MPa/sec.

In the present embodiment, it has been shown that the second preset pressure gradient XdPMB in the rapid braking determination logic in the third embodiment is made variable, this may be applied to the specified value XdPM in the second embodiment, or may be applied to the comparative threshold value of the maximum pressing force PBmax which may be used instead of the maximum M/C pressure gradient d(PM)/dtmax described in the second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A braking apparatus for a vehicle comprising:

an operation member operated by a driver of the vehicle;

a booster for exerting a braking force, according to an operation force of said operation member, on wheels of the vehicle;

braking force increasing means for increasing a braking force output of said booster irrespective of the operation force of said operation member;

braking condition determination means for determining whether a braking operation by said operation member is that of a normal braking condition or an emergency braking condition; and control means for, when the braking operation is determined by the braking condition determination means to be a normal braking condition, controlling the booster to exert a braking force according to the operation force of said operation member on the wheels, and for, when the braking operation is determined to be emergency braking condition, controlling is said braking force increasing means to increase a braking force output of the booster irrespective of the operation force of said operation member, to thereby exert a braking force larger than the braking force normally exerted on the vehicle wheels.

2. The braking apparatus for a vehicle of claim 1, wherein said braking condition determination means includes operation force detection means for detecting the operation force of said operation member, and wherein an emergency braking condition is determined when a maximum operation force of the operation force detected by said operation force detection means is greater than a preset operation force and when an operation time, from the beginning of operation of said operation member until the maximum operation force is reached, is greater than a preset length of time.

3. The braking apparatus for a vehicle of claim 2, wherein said braking condition determination means includes storage means for successively storing a value of the operation force and updating the value to a greater value detected by said operation force detection means, and wherein an emergency braking condition is determined when the maximum operation force, newly updated after the operation time exceeds the preset length of time, exceeds the preset operation force.

4. The braking apparatus for a vehicle of claim 2 or claim 3, wherein said operation member is a brake pedal, and said operation force detection means is a pressing force sensor mounted to the brake pedal.

5. The braking apparatus for a vehicle of claim 1, wherein said booster is linked to said operation member and is provided with a master cylinder for converting the operation force of said operation member to a hydraulic pressure and outputting a braking force acting upon the vehicle wheels.

6. The braking apparatus for a vehicle of claim 5, wherein said braking condition determination means is provided with pressure detection means for detecting the hydraulic pressure as an output of said master cylinder, and wherein an emergency braking condition is determined when a maximum pressure gradient of a pressure gradient detected by said pressure detection means is greater than a preset pressure gradient, and when a time lapse from the beginning of operation of said operation member until the maximum pressure gradient is reached is greater than a preset time lapse.

7. The braking apparatus for a vehicle of claim 6, wherein said braking condition determination means includes storage means for successively storing a value, and updating the value to a greater value, of the pressure gradient value detected by said pressure detection means as the maximum pressure gradient, and wherein an emergency braking condition is determined when the maximum pressure gradient, newly updated after the operation time exceeds the preset time lapse, exceeds the preset pressure gradient.

8. The braking apparatus for a vehicle of claim 6 or claim 7, further comprising:

vehicle speed detection means for detecting a speed of the vehicle;

steering wheel angle detection means for detecting a steering wheel angle of the vehicle;

an accelerator opening sensor for detecting an accelerator opening of the vehicle;

first estimation means for estimating a traffic condition of the vehicle from a running time ratio and an average speed derived from the vehicle speed detected by the vehicle speed detection means, and from an average lateral acceleration derived from the detected vehicle speed and the steering wheel angle detected by said steering wheel angle detection means;

second estimation means for estimating an operation tendency of the driver from a frequency analysis value of an accelerator opening derived from the accelerator opening detected by said accelerator opening sensor, a frequency analysis value of the vehicle speed detected by said vehicle speed sensor, a frequency analysis value of a longitudinal direction acceleration derived from the detected vehicle speed, a frequency analysis value of lateral acceleration derived from the detected vehicle speed and the detected steering wheel angle, and from the traffic condition estimated by said first estimation means; and preset pressure gradient changing means for changing a preset pressure gradient according to the operation tendency estimated by said second estimation means.

9. The braking apparatus for a vehicle of claim 8, wherein said second estimation means determines frequency distributions of individual parameters of the detected accelerator opening, the detected vehicle speed, the longitudinal direction acceleration, and the detected lateral acceleration, and estimates the operation tendency from a weighted total sum of average values and variances of the individual parameters derived from the frequency distributions and the traffic condition estimated by said first estimation means.

10. The braking apparatus for a vehicle of claim 5, wherein said braking condition determination means is provided with pressure detection means for detecting the hydraulic pressure as an output of said master cylinder, and wherein an emergency braking condition is determined when a first condition is met, where an average value of the detected pressure from a time at which a pressure gradient detected by said pressure detection means to a time before a first preset time, added with a preset value, is greater than the detected hydraulic pressure, after a second preset time from the first preset time, thereafter the time lapse from the second preset time is greater than a third preset time, and pressure gradient is greater than a second preset pressure gradient.

11. The braking apparatus for a vehicle of claim 10, wherein said braking condition determination means measures a length of time when the pressure gradient is zero or a negative value when the first condition is met, determines a normal braking condition when the measured length of time is greater than a fourth preset time, and cancels the meeting of the first condition.

12. The braking apparatus for a vehicle of claim 10, further comprising:

vehicle speed detection means for detecting a speed of the vehicle;

a steering wheel angle sensor for detecting a steering wheel angle of the vehicle;

an accelerator opening sensor for detecting an accelerator opening of the vehicle;

first estimation means for estimating a traffic condition of the vehicle from a running time ratio and an average speed derived from the vehicle speed detected by said vehicle speed detection means, and an average lateral acceleration derived from the detected vehicle speed and the steering wheel angle detected by said steering wheel angle detection means;

second estimation means for estimating an operation tendency of the driver of the vehicle from a frequency analysis value of an accelerator opening derived from the accelerator opening detected by said accelerator opening sensor, a frequency analysis value of vehicle speed detected by said vehicle speed sensor, a frequency analysis value of a longitudinal direction acceleration derived from the detected vehicle speed, a frequency analysis value of lateral acceleration derived from the detected vehicle speed and the detected steering wheel angle, and the traffic condition estimated by said first estimation means; and preset pressure gradient changing means for changing a second preset pressure gradient according to the operation tendency estimated by said second estimation means.

13. The braking apparatus for a vehicle of claim 12, wherein said second estimation means determines frequency distributions of individual parameters of the detected accelerator opening, the detected vehicle speed, the longitudinal direction acceleration, and the detected lateral acceleration, and estimates the operation tendency from a weighted total sum of average values and variances of the individual parameters derived from the frequency distributions and the traffic condition estimated by said first estimation means.

14. The braking apparatus for a vehicle of claim 1, wherein said control means includes operation detection means for detecting whether or not the driver operates said operation member, and first prohibition means for prohibiting operation of said braking force increasing means when the operation detection means detects that the driver does not operate said operation member, after an emergency braking condition is determined by said braking condition determination means.

15. The braking apparatus for a vehicle of claim 1, wherein said control means includes operation force detection means for detecting the operation force of said operation member, and second prohibition means for prohibiting operation of said braking force increasing means when the operation force detected by said operation force detection means is less than a preset value after an emergency braking condition is determined by said braking condition determination means.

16. A braking method for a vehicle comprising the steps of:

(a) determining whether a braking operation by an operation member, operated by a driver of the vehicle, is a normal braking condition or an emergency braking condition;

(b) applying a braking force according to an operation force of the operation member, when the braking operation is determined in step (a) to be a normal braking condition; and (c) increasing the braking force acting upon the vehicle wheels, irrespective of the operation force of the operation member, when the braking operation is determined in step (a) to be an emergency braking condition, to exert a braking force larger than applied during normal braking on the vehicle wheels.

17. The braking method for a vehicle of claim 16, wherein step (a) includes the substeps of, (a1) detecting the operation force of the operation member, and (a2) determining an emergency braking condition when a maximum operation force of the operation force detected in step (a1) is greater than a preset operation force and a length of time, from a beginning of operation of the operation member until the maximum operation force is reached, is greater than a preset length of time.

18. The braking method for a vehicle of claim 17, wherein step (a) includes the further substeps of, (a3) storing a value of the detected operation force, (a4) successively updating the stored value of substep (a3) to store a maximum operation force, and (a5) determining an emergency braking condition when the maximum operation force, newly updated after the operation length of time exceeds the preset length of time, exceeds the preset operation force.

19. The braking method for a vehicle of claim 18, further comprising the steps of, estimating a traffic condition of the vehicle from a running time ratio and an average speed derived from a detected speed of the vehicle, and from an average lateral acceleration derived from the detected vehicle speed and a detected steering wheel angle of the vehicle;

estimating an operation tendency of the vehicle driver from a frequency analysis value of an accelerator opening derived from a detected accelerator opening of the vehicle, a frequency analysis value of the detected vehicle speed, a frequency analysis value of a longitudinal direction acceleration derived from the detected vehicle speed, a frequency analysis value of lateral acceleration derived from the detected vehicle speed and the detected steering wheel angle; and varying the estimated traffic condition, and the second preset pressure gradient according to the estimated operation tendency.

20. The braking method for a vehicle of claim 19, wherein frequency distributions of the individual parameters of the detected accelerator opening, the detected vehicle speed, the derived longitudinal direction acceleration, and the derived lateral acceleration are determined, and the method further includes the steps of, estimating the operation tendency from a weighted total sum of average values and variances of the individual parameters determined from the frequency distributions and the estimated traffic condition.

21. The braking method for a vehicle of claim 16, further comprising the steps of, (d) converting the operation force of the operation member to a hydraulic pressure;

(e) outputting a braking force acting upon the vehicle wheels;

(f) detecting the hydraulic pressure of step (d); and (g) determining an emergency braking condition when a maximum pressure gradient of a pressure gradient of the detected hydraulic pressure of step (f) is greater than a preset pressure gradient, and when a time lapse from a beginning of operation of the operation member until the maximum pressure gradient is reached is greater than a preset time lapse.

22. The braking method for a vehicle of claim 21, wherein step (a) includes the substeps of, (a1) storing a greater value of the pressure gradient value, (a2) successively updating the stored value of substep (a1) to a greater value of the pressure gradient value to store a maximum pressure gradient, and (a3) determining an emergency braking condition when the maximum pressure gradient, newly updated after the operation time lapse exceeds the preset time, exceeds the preset pressure gradient.

23. The braking method for a vehicle of claim 21 or 22, further comprising the steps of, estimating a traffic condition of the vehicle from a running time ratio and an average speed derived from a detected speed of the vehicle, and from an average lateral acceleration derived from the detected vehicle speed and a detected steering wheel angle of the vehicle;

estimating an operation tendency of the driver from a frequency analysis value of an accelerator opening derived from a detected accelerator opening of the vehicle, a frequency analysis value of the detected vehicle speed, a frequency analysis value of a longitudinal direction acceleration derived from the detected vehicle speed, a frequency analysis value of lateral acceleration derived from the detected vehicle speed and the detected steering wheel angle; and varying the preset pressure gradient according to the estimated operation tendency.

24. The braking method for a vehicle of claim 23, wherein frequency distributions of the individual parameters of the detected accelerator opening, the detected vehicle speed, the derived longitudinal direction acceleration, and the derived lateral acceleration are determined, and estimating the operation tendency from a weighted total sum of average values and variances of the individual parameters determined from the frequency distributions and the estimated traffic condition.

25. The braking method for a vehicle of claim 21, wherein the hydraulic pressure is detected as an output of a master cylinder of the vehicle, and an emergency braking condition is determined in step (a) when a first condition is met where an average value of the detected hydraulic pressure, from a time at which a pressure gradient is detected, to a time before a first preset time added with the preset value, is greater than the detected hydraulic pressure, after a second preset time from the first preset time, thereafter the time lapse from the second preset time is greater than a third preset time, and pressure gradient is greater than a second preset pressure gradient.

26. The braking method for a vehicle of claim 25, further comprising the steps of, (d) measuring a length of time when the pressure gradient is zero or a negative value when the first condition is met;

(e) determining a normal braking condition when the measured length of time is greater than a fourth preset time; and (f) canceling the meeting of the first condition.

27. The braking method for a vehicle of claims 16, 17, 18, 21, 22, 25, or 26, further comprising the steps of, determining whether or not the vehicle driver operates the operation member; and prohibiting increase of the braking force when it is determined that the driver does not operate the operation member, after an emergency braking condition is determined.

28. The braking method for a vehicle of claims 16, 17, 18, 21, 22, 25, or 26, further comprising the steps of, detecting the operation force of the operation member is detected; and prohibiting increase of the braking force when the detected operation force is less than a preset value, after an emergency braking condition is determined.

* * * * *